United States Patent
Targali

(10) Patent No.: US 11,785,447 B2
(45) Date of Patent: Oct. 10, 2023

(54) IDENTIFIER-BASED ACCESS CONTROL IN MOBILE NETWORKS

(71) Applicant: T-Mobile USA, Inc., Bellevue, WA (US)

(72) Inventor: Yousif Targali, Sammamish, WA (US)

(73) Assignee: T-Mobile USA, Inc., Bellevue, WA (US)

(*) Notice: Subject to any disclaimer, the term of this patent is extended or adjusted under 35 U.S.C. 154(b) by 20 days.

(21) Appl. No.: 17/682,443

(22) Filed: Feb. 28, 2022

(65) Prior Publication Data

US 2022/0394462 A1 Dec. 8, 2022

Related U.S. Application Data

(62) Division of application No. 15/982,448, filed on May 17, 2018, now Pat. No. 11,265,699.

(Continued)

(51) Int. Cl.
| | | |
|---|---|---|
| *H04W 8/26* | (2009.01) | |
| *H04W 48/16* | (2009.01) | |
| *H04L 9/32* | (2006.01) | |
| *H04L 9/40* | (2022.01) | |
| *H04W 8/18* | (2009.01) | |
| *H04W 12/06* | (2021.01) | |

(52) U.S. Cl.
CPC .............. *H04W 8/26* (2013.01); *H04L 9/3236* (2013.01); *H04L 63/0876* (2013.01); *H04W 8/18* (2013.01); *H04W 48/16* (2013.01); *H04W 12/06* (2013.01)

(58) Field of Classification Search
None
See application file for complete search history.

(56) References Cited

U.S. PATENT DOCUMENTS

| 6,427,073 B1 | 7/2002 | Kortesalmi et al. |
| 9,992,638 B1 * | 6/2018 | Oyekanmi ............ H04W 12/06 |

(Continued)

OTHER PUBLICATIONS

3GPP TR 33.899 V1.3.0. "3rd Generation Partnership Project; Technical specification Group Services and System Aspects; Study on the Security Aspects of the Next Generation System", Aug. 2017, pp. 64-66, 179-185, 195-225, 228-249, 263-268, 310-313, 378-380, 389-468, 586.

(Continued)

*Primary Examiner* — Suhail Khan
(74) *Attorney, Agent, or Firm* — Lee & Hayes, P.C.

(57) ABSTRACT

A network terminal, e.g., LTE or 5G, can connect to a home network via a serving network. The terminal can have a terminal identifier (TID), such as an IMEI or other PEI, and a network subscriber can have a subscriber identifier (SID), such as an IMSI or other SUPI. In some nonlimiting examples, a network node can determine that a SID and a TID are authorized for joint use and, in response, transmit authorization information. In some nonlimiting examples, a network node can receive an attach request having verification data and encrypted identification data. The network node can receive decrypted identity data and determine that the identity data corresponds with the verification data. In some nonlimiting examples, the terminal can send an attach request comprising encrypted SID and TID data, and a cryptographic hash, to a network node.

20 Claims, 18 Drawing Sheets

Related U.S. Application Data

(60) Provisional application No. 62/634,374, filed on Feb. 23, 2018.

(56) References Cited

U.S. PATENT DOCUMENTS

| | | | |
|---|---|---|---|
| 2006/0182280 | A1 | 8/2006 | Laitinen et al. |
| 2009/0282251 | A1 | 11/2009 | Cook et al. |
| 2012/0135713 | A1 | 5/2012 | Lee et al. |
| 2012/0311335 | A1 | 12/2012 | Fransen |
| 2012/0331298 | A1 | 12/2012 | Xu et al. |
| 2013/0163762 | A1 | 6/2013 | Zhang et al. |
| 2013/0297937 | A1 | 11/2013 | Fransen |
| 2014/0235206 | A1 | 8/2014 | Denhez |
| 2016/0255064 | A1 | 9/2016 | Naslund et al. |
| 2016/0277928 | A1 | 9/2016 | Yue et al. |
| 2018/0199398 | A1 | 7/2018 | Dao et al. |
| 2018/0270666 | A1 | 9/2018 | Lee et al. |
| 2018/0331829 | A1 | 11/2018 | Wang et al. |
| 2019/0007376 | A1 | 1/2019 | Norrman et al. |
| 2019/0044943 | A1 | 2/2019 | Kim |
| 2019/0182654 | A1 | 6/2019 | Jerichow et al. |
| 2019/0268335 | A1 | 8/2019 | Targali |
| 2019/0268759 | A1 | 8/2019 | Targali |
| 2020/0252398 | A1 | 8/2020 | Targali |
| 2020/0396711 | A1 | 12/2020 | He et al. |

OTHER PUBLICATIONS

3GPP TS 23.501 V15.1.0, 3rd Generation Partnership Project; Technical Specification Group Services and System Aspects; System Architecture for the 5G System; Stage 2, Mar. 2018, pp. 119-126.

3GPP TS 33 501 V15.1.0, 3rd Generation Partnership Project; Technical Specification Group Services and System Aspects; Security Architecture and Procedures for 5G System, Jun. 2018, pp. 16-19, 30-46, 52-53, 56-60, 69-70, 125-131.

3GPP TS 33.501 V0.7.1, "3rd Generation Partnership Project; Technical Specification Group Services and System Aspects; Security Architecture and Procedures for 5G System", Jan. 2018, pp. 1-8, 15-16, 27, 29, 31, 33-41, 43-48, 58-78, 93-98, 102-104, 110, 112.

5G Core Network (5GC) Functions—Grandmetric blog, Mar. 2, 2018, retrieved Mar. 30, 2018 from https://www.grandmetric.com/blog/2018/03/02/5g-core-network-functions, pp. 1 and 2.

"AV Authentication Vector", Mpirical, Mar. 23, 2018, from <<https://web.archive.org/web/20180323185039/https://www.mpirical.com/glossary/av-authentication-vector>>, 3 pages.

Engel, T., "SS7: Locate. Track. Manipulate.", Dec. 2014, retrieved Feb. 26, 2018 from <<https://berlin.ccc.de/~tobias/31c3-ss7-locate-track-manipulate.pdf>>, pp. 7, 9, 10, and 45-53.

ETSI TS 124 301 V14.4.0, "Universal Mobile Telecommunications System (UMTS); LTE; Non-Access-Stratum (NAS) Protocol for Evolved Packet System (EPS); Stage 3", Jul. 2017, pp. 85-86.

ETSI TS 133 102 V14.1.0, Digital Cellular Telecommunications System (Phase 2+) (GSM); Universal Mobile Telecommunications System (UMTS); 3G Security; Security Architecture, Mar. 2017, pp. 19-25.

ETSI TS 133 105 V14.0.0, Universal Mobile Telecommunications System (UMTS); LTE; 3G Security; Cryptographic Algorithm Requirements, Apr. 2017, pp. 8-14.

ETSI TS 133 220 V14.1.0, Digital Cellular Telecommunications System (Phase 2+) (GSM); Universal Mobile Telecommunications System (UMTS); LTE; Generic Authentication Architecture (GAA); Generic Bootstraping Architecture (GBA), Jul. 2017, pp. 38-42.

ETSI TS 133 401 V13.2.0, "Digital Cellular Telecommunications System (Phase 2+) (GSM); Universal Mobile Telecommunications System (UMTS); LTE; 3GPP System Architecture Evolution (SAE); Security Architecture", Apr. 2016, pp. 20-46, 76-85, 123, 128, 132, 135-138.

"GUTI—Understanding the Unique ID in LTE", RCRWireless, May 9, 2014, 5 pages.

Harshita, "5G: What is the Significance of New Terms "SUCI" and "SUPI"? And Also Which all Places are Used?", Feb. 2018, retrieved Mar. 23, 2018 from http://web.archivve.org/web/20180323150154/https://tech.queryhome.com/167251/what-significance-terms-suc-supi-also-which-places-both-used>>, 2 pages.

"IMS Procedures and Protocols; The LTE User Equipment Perspective" Spirent, 2014, pp. 3-5.

KPN, Removing of Edito □s Notes about SIDF, SUCI and SUPI in clause 3.3, S3-180825, 3GPP TSG SA WG3 Meeting No. 90Bis, San Diego, USA, Feb. 19, 2018, 6 pages.

Li et al., "Security Enhanced Authentication and Key Agreement Protocol for LTE/SAE Network", College of Computer, National University of Defense Technology, Changsha, P.RChina, 4 pages.

LTE Security II: NAS and AS Security, Netmanias, Aug. 5, 2013, retrieved Jun. 17, 2016 from http://www.netmanias.com/en/?m=view&id=techdocs&no=5903, pp. 1-12.

LTE Security Overview, Oct. 2012, retrieved May 31, 2018 from https://www.slideshare.net/aliirfan04/lte-security-overview, p. 15.

Motorola Mobility et al., 23.502: Changes to Registration procedure for SUPI, S2-178711, 3GPP TSG SA WG2 Meeting No. 124, Reno, Nevada, Nov. 21, 2017, 9 pages.

NEC, 5G UE Security Capability with KDF identifiers, S3-172466, 3GPP TSG SA WG3 Meeting No. 88Bis Adhoc, Singapore, Oct. 2, 2017, 7 pages.

Nokia, Discussion on LI conformity by verification hash method, S3-180768, 3GPP TSG SA WG3 Meeting 90Bis, San Diego, USA, Feb. 19, 2018, 10 pages.

Office Action for U.S. Appl. No. 16/855,488, dated Jan. 19, 2021, Targali, "Key-Derivation Verification in Telecommunications Network", 12 pages.

Office Action for U.S. Appl. No. 16/855,488, dated Jul. 28, 2021, Targali, "Key-Derivation Verification in Telecommunications Network", 13 pages.

Office Action for U.S. Appl. No. 16/033,555, dated Feb. 14, 2019, Targali, "Key-Derivation Verification in Telecommunications Network", 23 pages.

Office Action for U.S. Appl. No. 15/982,448, dated Apr. 4, 2019, Targali, "Identifier-Based Access Control in Mobile Networks", 18 pages.

Office Action for U.S. Appl. No. 16/033,555, dated May 16, 2019, Targali, "Key-Derivation Verification in Telecommunications Network", 40 pages.

Office Action for U.S. Appl. No. 15/982,448, dated Jul. 18, 2019, Targali, "Identifier-Based Access Control in Mobile Networks", 22 pages.

PCT Search Report and Written Opinion dated May 27, 2019 for PCT Application No. PCT/US2019/018167, 11 pages.

Qualcomm Incorporated et al., 'TS 23.502: Modification of the Registration procedure for UE Identity Request', S2-175702, 3GPP TSG SA WG2 Meeting No. 122bis, Sophia Antipolis, France, Aug. 15, 2017, 10 pages.

Krawczyk et al., "HMAC: Keyed-Hashing for Message Authentication", Request for Comments: 2104, Feb. 1997, pp. 1-4.

Saboorian, et al., "Network Slicing and 3GPP Service and Systems Aspects (SA) Standard", IEEE Softwarization, Dec. 2017, retrieved Jun. 5, 2018 from <<https://sdn.ieee.org/newsletter/december-2017/network-slicing-and-3gpp-service-and-system-aspects-sa-standard>>, pp. 1-5.

Sahu, P., "LTE Security Architecture", 3GLTEinfo, Mar. 25, 2011, retrieved Mar. 24, 2018 from <<http://web.archive.org/web/20170820105504/http://www.3glteinfo.cm/lte-security-architecture/>>, pp. 3-7.

"Secure Hash Standard SHS", FIPS Pub 180-4, Aug. 2015, pp. 13-15, 21-23.

Zhang, et al., "Overview of 5G Security in 3GPP", 2017, retrieved Feb. 22, 2018 from <<https://www.researchgate.net/profile/Andreas_Kunz2/publication/319527681_Overview_of_5G_security_in_3GPP/links/59b116d80f7e9b37434a8248/Overview-of-5G-security-in-3GPP.pdf>>, 7 pages.

* cited by examiner

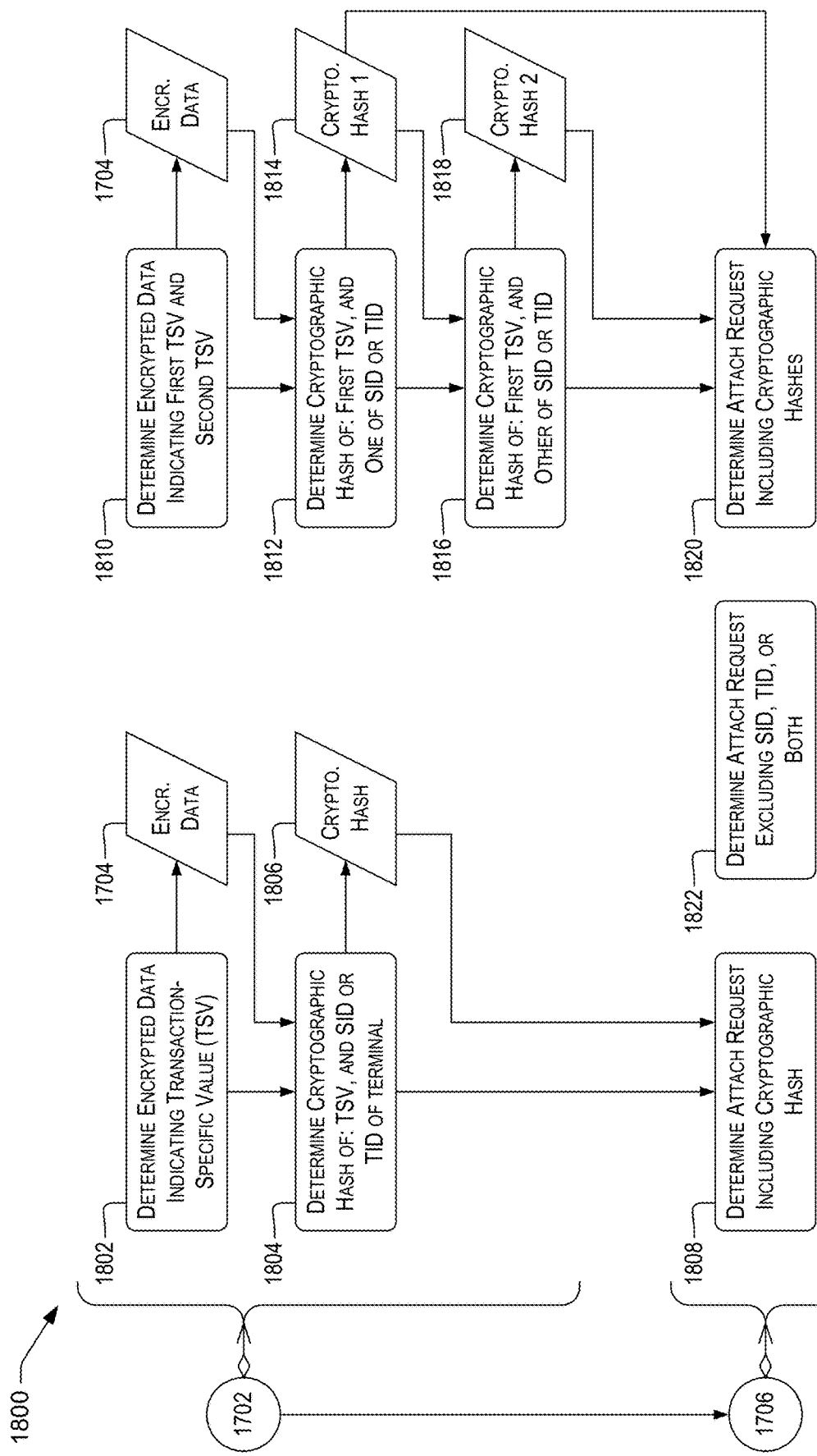

IDENTIFIER-BASED ACCESS CONTROL IN MOBILE NETWORKS

CROSS-REFERENCE TO RELATED APPLICATIONS

This application is a Divisional of and claims priority to U.S. patent application Ser. No. 15/982,448, filed on May 17, 2018 and entitled "Identifier-Based Access Control in Mobile Networks," which is a nonprovisional application of, and claims priority to and the benefit of, U.S. Patent Application Ser. No. 62/634,374, filed Feb. 23, 2018, and entitled "Subscriber and Equipment Identifiers in Mobile Networks," the entire contents of which are incorporated herein by reference.

BACKGROUND

Telecommunications terminals (sometimes referred to as user equipment, or UE), such as cellular telephones, may connect to a variety of wireless telecommunications networks that are operated by different companies. These telecommunications networks may be cellular networks that operate according to a variety of protocols, such as a Long-Term Evolution (LTE), a Voice over LTE (VoLTE), an LTE-in-unlicensed-spectrum (LTE-u), or a fifth generation mobile network (5G) protocol. In the course of a terminal registering to, and communicating via, a telecommunications network, information that identifies a user of the terminal may be conveyed between the terminal and the telecommunications network.

BRIEF DESCRIPTION OF THE DRAWINGS

The Detailed Description is set forth with reference to the accompanying figures. Identical reference numerals have been used, where possible, to designate features of FIGS. 1 and 2 that are also shown on other figures. The attached drawings are for purposes of illustration and are not necessarily to scale. For brevity of illustration, in the diagrams herein, an arrow beginning with a diamond connects a first component or operation (at the diamond end) to at least one second component or operation that is or can be included in the first component or operation.

FIG. 18 is a dataflow diagram of an example process for determining an attach request, e.g., at a terminal.

DETAILED DESCRIPTION

Overview

Figure 1:
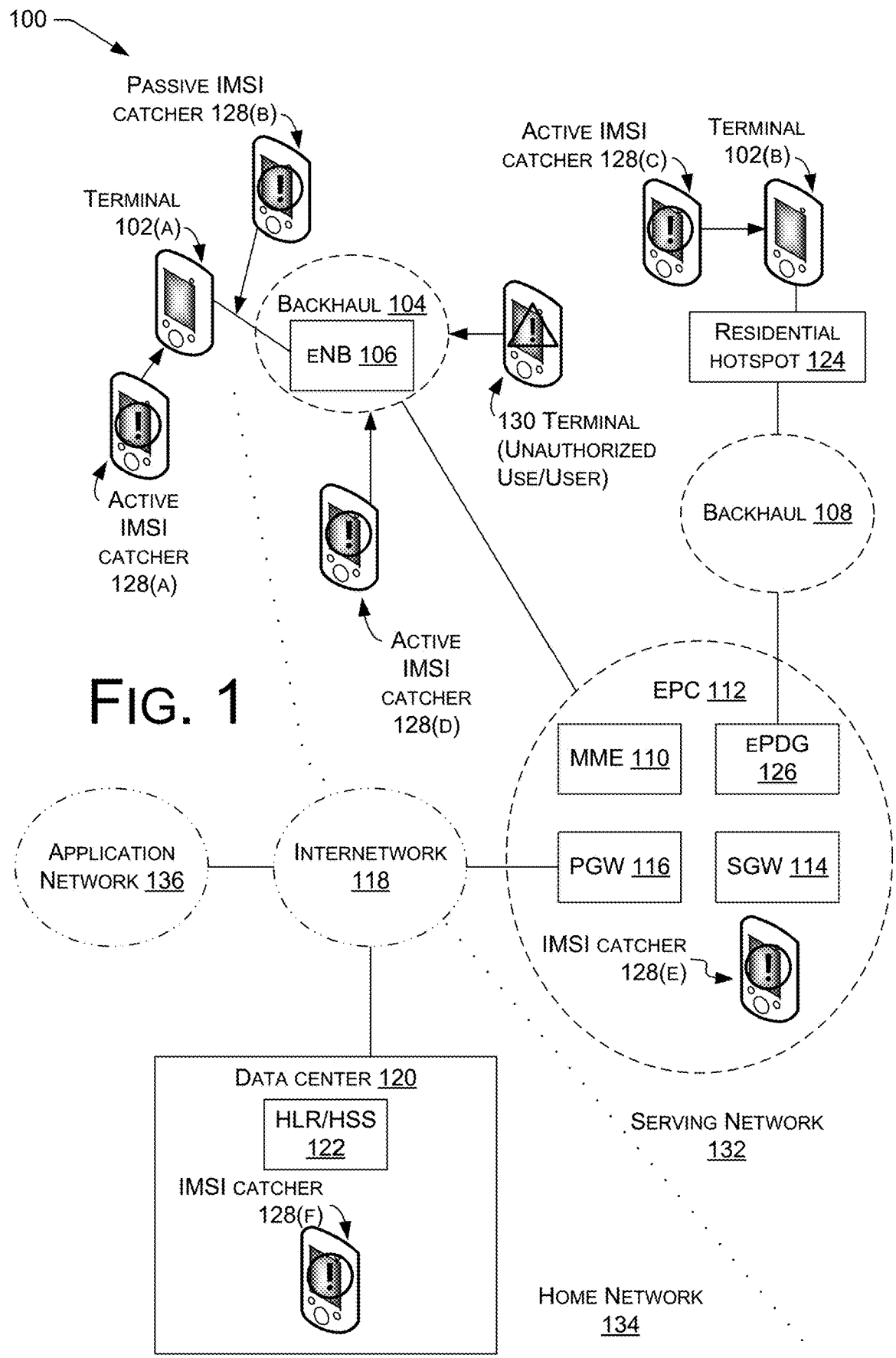
FIG. 1 illustrates an example network architecture for a telecommunications network that can provide for improved mobile subscriber privacy and network security.

In the process of a terminal registering to, and communicating via a telecommunications network, the terminal may provide personally identifiable information (PII) to the telecommunications network, which is used to identify the terminal. As used herein, a terminal may be a feature phone, a smartphone, a tablet computer, a phablet, an embedded computer system, an Internet of Things (IoT) device, or any other computing device that is capable of using wireless communication services that are provided by communication networks (of one type or various types).

This PII may comprise an International Mobile Subscriber Identity (IMSI), an International Mobile Equipment Identity (IMEI), or a Mobile Subscriber International Subscriber Directory Number (MSISDN). The IMSI may comprise a 14- or 15-digit number, which is stored on a Subscriber Identity Module (SIM) card that is inserted into the terminal and stored in the Home Operator Database (e.g., a Home Location Register (HLR), or a Home Subscriber Server (HSS)). If an attacker obtains access to view communications across the telecommunications network, then the attacker may identify a particular user based on the IMSI or other PII associated with his or her terminal. Since terminals are connected to specific physical points on the telecommunications network (e.g., a cell tower or a residential hotspot), the attacker may use this IMSI to determine, and track, where a user is physically located.

Moreover, a terminal may transmit multiple forms of PII, such as both an IMSI and an IMEI. However, some prior schemes do not cross-check these forms of PII. Therefore, a malicious actor can steal a terminal and register for communication services using the IMSI of the malicious user together with the IMEI of the stolen terminal.

A solution to the problem of attackers being able to track users is to prevent attackers from obtaining and monitoring IMSIs. One solution is to encrypt the IMSI. For example, using public key cryptography, when the IMSI is transmitted, it may be encrypted with the public key of the destination device, e.g., the public key of the terminal, serving network (a portion of a telecommunications network that communicates directly with the terminal; when the terminal is roaming, the serving network is a visited network), or home network. Then, that destination, e.g., the terminal, serving network, or home network—may decrypt the IMSI using its private key.

However, a problem with this encryption approach is that it may open an attack vector of a denial-of-service (DoS) attach such as a distributed DoS (DDoS) attack. Multiple terminals could launch a DDoS attack against an HLR or an HSS) of a home network, by substantially concurrently sending encrypted fake IMSIs during a registration process. Where the HLR/HSS is configured to decrypt the IMSIs, and other components of the telecommunications network are not so configured, then the HLR/HSS spends computing resources on decrypting these fake and may become overloaded doing so.

Various examples provide at least one of: increased privacy of PII; reduced risk of use of unauthorized or stolen terminals; or protection from DDoS attacks. While the embodiments described herein generally focus on the use of an IMSI and an IMEI, it may be appreciated that these techniques may be applied to other forms of PII. For example, embodiments herein that process IMSIs can additionally or alternatively process other types of subscriber identifier, such as a 5G Subscriber Permanent Identifier (SUPI). In some example 5G networks, a SUPI is allocated to each subscriber for 5G services. SUPIs can include, e.g., IMSIs or network access identifiers (NAIs). In some examples, embodiments herein that process IMEIs can additionally or alternatively process other types of device identifier, such as a Permanent Equipment Identifier (PEI). In some example 5G networks, each terminal has a PEI for accessing 5G services. PEIs can include, e.g., IMEIs and IMEIs with software-version codes (IMEISVs).

Steps of various methods described herein can be performed in any order except when otherwise specified, or when data from an earlier step is used in a later step. Example method(s) described herein are not limited to being carried out by components particularly identified in discussions of those methods.

Various examples include methods and systems to enable secure binding between subscriber identity and device used for mobile communications. Examples provide protection for subscriber privacy, and at the same time, mitigate transparently against fraud scenarios of using unauthorized or stolen devices. Various examples enable complying with regulatory and lawful-intercept requirements.

Various examples include methods and systems that enable secure binding between subscriber identifier (e.g., SUPI) and device identifier (e.g. IMEI) used for mobile communications. Various examples include privacy security enhancement techniques that provide protection for subscriber privacy, and also reduce the chance of occurrence of fraud scenarios such as using unauthorized or stolen devices. In the current mobile networks, PII (e.g. SUPI, IMEI, or MSISDN) can be compromised and exposed in various ways, via a passive or active attacks, over the radio, or within operator's network. Various examples described herein use a combination of encryption and hashing methods to provide secure subscriber and device bindings to provide enhanced subscriber privacy, and prevent fraud attacks of using unauthorized devices. Various examples herein securely bind subscriber identifiers to device identifiers, thereby enhancing privacy protection and reducing the risk of fraudulent use of unauthorized or stolen devices. Various examples herein provide enhanced privacy protection for network users or protect against use by malicious actors of unauthorized or stolen devices.

Illustrative Environments, Computing Devices, and Techniques

FIG. 1 illustrates an example network architecture 100 for a telecommunications network that provides for enhanced mobile subscriber privacy or reduced risk of fraudulent use. FIG. 1 shows an example of a network architecture, and there may be other network architectures in which enhanced mobile subscriber privacy may be implemented. For brevity, not all connections between devices are shown. For examples, the devices within EPC 112 can communicate with each other, even though the communications paths are not depicted on the drawing. The illustrated example includes two terminals 102(a) and 102(b).

Terminal 102(a) connects to backhaul 104, which can include evolved node B (eNB) 106. Backhaul 104 (and backhaul 108) comprises a communications connection between a core of a telecommunications network and an edge to which a terminal may connect. eNB 106 is a point in a telecommunications network that connects with terminals, such as terminal 102(a). eNB 106 may send and receive wireless communications with terminal 102(a). eNB 106 is connected with Mobile Management Entity (MME) 110 of Evolved Packet Core (EPC) 112. MME 110 is configured to find, route, maintain, and transfer communications. MME 110 is configured to perform end-to-end connection signaling and security services between core networks, and to maintain connection information about terminals, and determine which gateway is to be used to connect a terminal to another network. In some examples, an access network includes backhaul 104 and EPC 112, and provides communication between a terminal 102 and an application network (discussed below), e.g., an Internet Protocol (IP) Multimedia Subsystem (IMS) network or other network providing user-facing services to terminals 102. In some examples, the application network is an IMS that provides VoLTE service.

MME 110 is connected with Serving Gateway (SGW) 114. SGW 114 is configured to route and forward data packets, and act as an anchor for network connectivity when terminal 102(a) physically moves so is handed off from eNB 106 to another eNB (not shown). A terminal, such as terminal 102(a), may be associated with a single SGW, such as SGW 114, and MME 110 may determine that terminal 102(a) will utilize SGW 114 for a current session. In an architecture that includes a visited network and a home network, SGW 114 is also configured to be a point of contact the visited network with the home network, by communicating with a packet gateway (PGW) (such as PGW 116) of the home network.

In addition to being configured to be a point of contact between the visited network and the home network, PGW 116 can be configured to perform such functions as managing quality of service (QoS) for communications, performing deep packet inspection, and performing a Policy and Charging Enforcement Function (PCEF).

PGW 116 communicates via internetwork 118 with data center 120. Internetwork 118 can be or include, e.g., the public Internet; a private IP Packet Exchange (IPX) such as defined by GSMA; or a virtual private network (VPN) tunnel or overlay on either of those. Data center 120 may include HLR/HSS 122, which in some examples may be an HLR or an HSS. HLR/HSS 122 is a master user database that contains subscriber profiles for one or more terminal users that are associated with the home network, performs authentication and authorization for a user's terminal, and may provide information about a terminal's physical location and Internet Protocol (IP) information.

The other terminal 102(b) is also communicatively coupled to HLR/HSS 122, though via a different path through architecture 100 than for terminal 102(a). Terminal 102(b) is communicatively coupled to residential hotspot 124. Residential hotspot is configured to provide a WIFI or cellular wireless communications link between terminal 102(b) and HLR/HSS 122. Residential hotspot 124 is connected through backhaul 108 (which is similar to backhaul 104) to EPC 112, and may connect to EPC 112 via ePDG 126. ePDG 126 may secure a data transmission with a terminal, such as terminal 102(b), as it connects to EPC 112 via a communications link that does not adhere to a $3^{rd}$ Generation Partnership Project (3GPP) protocol. In this capacity, ePDG 126 may serve as a termination node of an IPsec tunnel that is established with terminal 102(b).

Also present in this example network architecture 100 are six attackers, IMSI catcher 128(a), IMSI catcher 128(b), IMSI catcher 128(c), IMSI catcher 128(d), IMSI catcher 128(e), and IMSI catcher 128(f). Each of these IMSI catchers may be implemented via hardware (such as data processing system 202 or 220 of FIG. 2) or software components that are implemented on hardware. Each of these IMSI catchers is present at a different point in example network architecture 100, but is configured to capture a mobile subscriber's PII, such as an IMSI; to participate in a DDoS; or to otherwise negatively affect the privacy of network users or the operation of the network.

IMSI catcher 128(a) is active because it actively tries to obtain the IMSI of terminal 102(a) by emulating fake or rogue base station and tricking terminal 102(a) into connecting to it instead of connecting with a real base station eNB 106.

IMSI catcher 128(b) is configured to capture an IMSI transmitted between terminal 102(a) and eNB 106. IMSI catcher 128(b) may be considered to be a passive IMSI catcher, in contrast to the active IMSI catcher 128(a). For example, IMSI catcher 128(b) can sniff packets transmitted wirelessly (or on a shared wired network, e.g., Ethernet) between terminal 102(a) and backhaul 104.

IMSI catcher 128(c) is configured to capture an IMSI transmitted between terminal 102(b) and residential hotspot 124. IMSI catcher 128(d) is configured to capture an IMSI as it is transmitted through backhaul 104. IMSI catcher 128(e) is configured to capture an IMSI as it is transmitted through EPC 112. IMSI catcher 128(f) is configured to capture an IMSI as it is transmitted through data center 120.

Each of these six IMSI catchers 128 may be utilized by an attacker to compromise mobile subscriber data. To reduce the risk of compromise of mobile subscriber data, network architecture 100 may be configured to implement one or more of the signal flows of FIGS. 5-9 or the operating procedures of FIGS. 10-18, as described herein.

Terminal 130 is an example of a terminal under control of (e.g., stolen by) an actor other than the subscriber associated with that terminal or a party authorized by that subscriber. Terminal 130 may or may not be used to carry out IMSI-catching, DDoS attacks, or other expressly malicious operations. Regardless, terminal 130 is being operated without consent of at least one of the subscriber or the network operator.

In some examples, EPC 112 and backhaul 104 are components of a serving network 132, and data center 120 is a component of a home network 134. This is represented by the dotted line in FIG. 1. In this example, terminals 102(a) and 102(b) are roaming in serving network 132 but issued by home network 134. A terminal can be roaming, e.g., when the terminal is connected via an access network operated by a network operator other than the terminal's home operator. The illustrated division is only one example; in other examples, terminals 102(a), 102(b) are connected to a backhaul of home network 134.

In the illustrated example, serving network 132 or home network 134 can communicate via internetwork 118 with at least one application network 136. Application network 136 can provide user-facing services, e.g., voice or video calling, asynchronous messaging, or file transfer. For example, application network 136 can include an IMS network supporting VoLTE. Application network 136 can be part of serving network 132 or of home network 134, or can be separate from both networks 132, 134.

Figure 2:
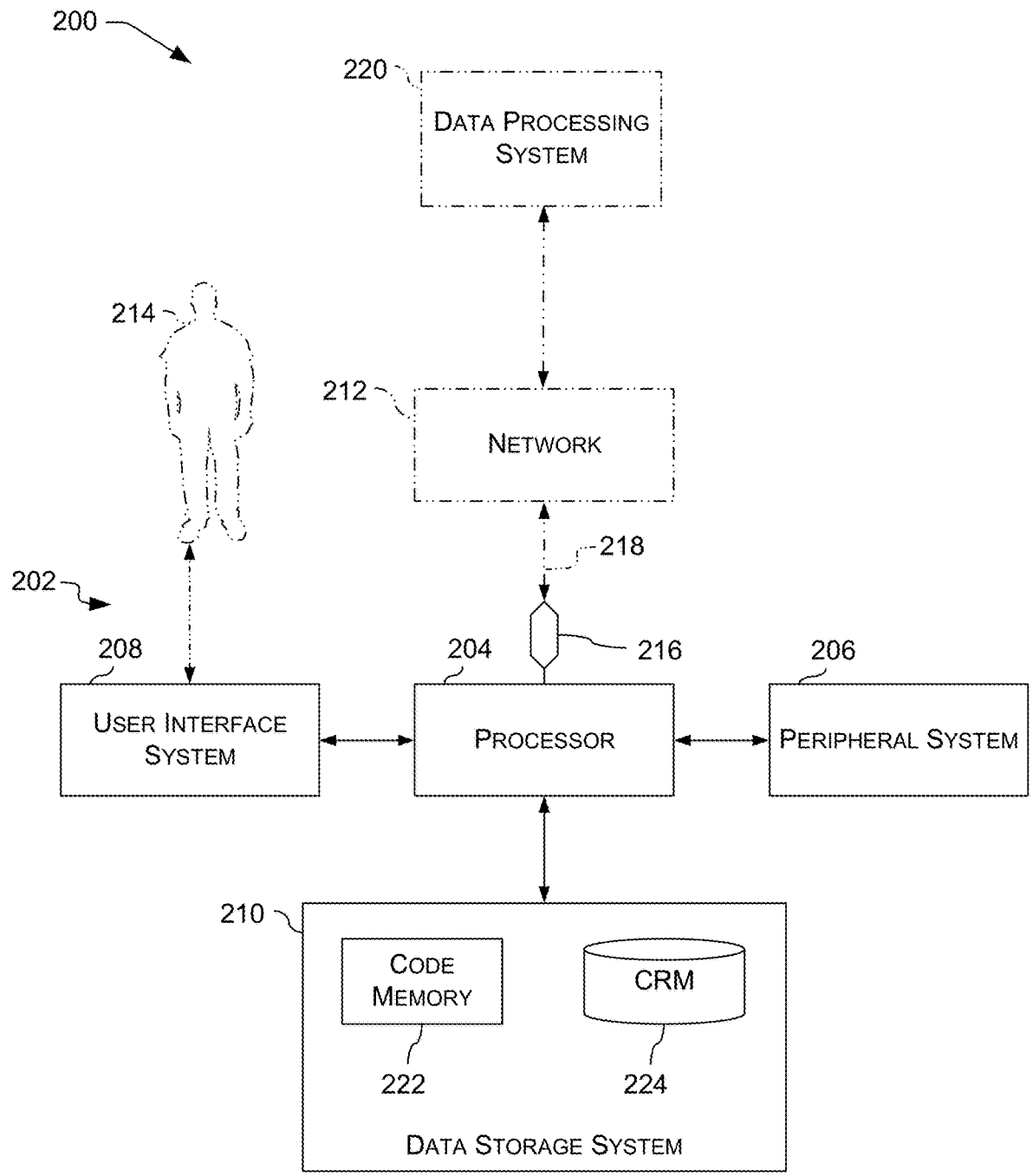
FIG. 2 is a high-level diagram showing the components of a data-processing system.

FIG. 2 is a high-level diagram 200 showing the components of an example data-processing system 202 for analyzing data and performing other analyses described herein, and related components. The system 202 includes a processor 204, a peripheral system 206, a user interface system 208, and a data storage system 210. The peripheral system 206, the user interface system 208 and the data storage system 210 are communicatively connected to the processor 204. Processor 204 can be communicatively connected to network 212 (shown in phantom), e.g., the Internet, a leased line, or a cellular network, as discussed below. Network 212 can be an example of internetwork 118. Terminals 102 or 130, nodes of serving network 132, nodes of home network 134, or other network nodes described herein can each include one or more of systems 204, 206, 208, 210, and can each connect to one or more network(s) 212. Processor 204, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Some example systems and techniques described herein can permit computing devices to communicate via telecommunications networks. The term "session" as used herein includes a communications path via at least one telecommunications network for exchange of data among two or more computing devices, referred to for brevity as "terminals." Example sessions include voice and video calls, e.g., by which human beings converse, a data communication session, e.g., between two electronic systems or between an electronic system and a human being, or a Rich Communication Services (RCS) session.

Telecommunications networks, such as network 212 or a component thereof, may include an application network 136 operated by one or more service providers ("carriers"), such as one or more cellular-telephony providers. The application network 136 is connected via access networks, e.g., serving network 132 or home network 134, to terminals. Terminals can be operated by users ("subscribers"), or can be autonomous. Example access networks carrying traffic of sessions can include second-generation (2G), third-generation (3G), or fourth-generation (4G) cellular networks; wired data networks such as Ethernet, Asynchronous Transfer Mode (ATM), Public Switched Telephone Network (PSTN), Data Over Cable Service Interface Specification (DOCSIS), digital subscriber line (DSL), or optical networks (e.g., Synchronous Optical NETwork, SONET); or wireless data networks such as Institute of Electrical and Electronics Engineers (IEEE) 802.11 (WIFI), 802.15.1 (BLUETOOTH), or 802.16 (WIMAX) networks carrying voice over Internet Protocol (VoIP) (e.g., VoWIFI) calls.

Some examples can include or be interoperable with Long Term Evolution (LTE) or 3GPP fifth-generation New Radio (5G NR) cellular networks, or any future IP-based cellular networks, carrying Voice over LTE (VoLTE) sessions using Session Initiation Protocol (SIP) signaling. In some examples, the network 212 can provide wide-area wireless coverage using a technology such as GSM or other 2G cellular technologies; the Universal Mobile Telecommunications System (UMTS) or other 3G cellular technologies; or LTE or other 4G cellular technologies. Example cellular-network technologies can include Code Division Multiple Access (CDMA), Time Division Multiple Access (TDMA), Evolution Data Optimized (EVDO), Advanced LTE (LTE+), Generic Access Network (GAN), Unlicensed Mobile Access (UMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), GSM/EDGE RAN (GERAN), Universal Terrestrial RAN (UTRAN), or evolved UMTS Terrestrial RAN (E UTRAN).

Processor 204 can implement processes of various aspects described herein. Processor 204 and related components can, e.g., carry out processes for conducting the call flows illustrated in FIGS. 5-9, e.g., at a UE or other terminal, a node of serving network 132 node, or a node of home network 134. Although various examples in FIGS. 1 and 3-9 show serving network 132 separately from home network 134, this is not required. In some examples, serving network 132 and home network 134 are separate. In other examples, the UE connects directly with home network 134, which performs functions described herein with reference to both serving network 132 and home network 134. Some examples use encryption to provide increased privacy even when not using a separate serving network 132.

Processor 204 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise.

The phrase "communicatively connected" includes any type of connection, wired or wireless, for communicating data between devices or processors. These devices or processors can be located in physical proximity or not. For example, subsystems such as peripheral system 206, user interface system 208, and data storage system 210 are shown separately from the processor 204 but can be stored completely or partially within the processor 204.

The peripheral system 206 can include or be communicatively connected with one or more devices configured or otherwise adapted to provide digital content records to the processor 204 or to take action in response to processor 204. For example, the peripheral system 206 can include digital still cameras, digital video cameras, cellular phones, or other data processors. The processor 204, upon receipt of digital content records from a device in the peripheral system 206, can store such digital content records in the data storage system 210.

The user interface system 208 can convey information in either direction, or in both directions, between a user 214 and the processor 204 or other components of system 202. The user interface system 208 can include a mouse, a keyboard, another computer (connected, e.g., via a network or a null-modem cable), or any device or combination of devices from which data is input to the processor 204. The user interface system 208 also can include a display device, a processor-accessible memory, or any device or combination of devices to which data is output by the processor 204. The user interface system 208 and the data storage system 210 can share a processor-accessible memory.

In various aspects, processor 204 includes or is connected to communications interface 216 that is coupled via network link 218 (shown in phantom) to network 212. Network link 218 can include a wired or wireless communication connection. For example, communications interface 216 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WIFI or GSM. Communications interface 216 sends and receives electrical, electromagnetic, or optical signals that carry digital or analog data streams representing various types of information across network link 218 to network 212. Network link 218 can be connected to network 212 via a switch, gateway, hub, router, or other networking device.

In various aspects, system 202 can communicate, e.g., via network 212, with a data processing system 220, which can include the same types of components as system 202 but is not required to be identical thereto. Systems 202, 220 can be communicatively connected via the network 212. Each system 202, 220 can execute computer program instructions to conduct at least a portion of an exchange described herein with reference to any of FIGS. 5-18. For example, system 202 can be a terminal 102 and system 220 can be a node of serving network 132, or system 202 can be a node of serving network 132 and system 220 can be a node of home network 134.

Processor 204 can send messages and receive data, including program code, through network 212, network link 218 and communications interface 216. For example, a server can store requested code for an application program (e.g., a JAVA applet) on a tangible non-volatile computer-readable storage medium to which it is connected. The server can retrieve the code from the medium and transmit it through network 212 to communications interface 216. The received code can be executed by processor 204 as it is received, or stored in data storage system 210 for later execution.

Data storage system 210 can include or be communicatively connected with one or more processor-accessible memories configured or otherwise adapted to store information. The memories can be, e.g., within a chassis or as parts of a distributed system. The phrase "processor-accessible memory" is intended to include any data storage device to or from which processor 204 can transfer data (using appropriate components of peripheral system 206), whether volatile or nonvolatile; removable or fixed; electronic, magnetic, optical, chemical, mechanical, or otherwise. Example processor-accessible memories include but are not limited to: registers, floppy disks, hard disks, solid-state drives (SSDs), tapes, bar codes, Compact Discs, DVDs, read-only memories (ROM), erasable programmable read-only memories (EPROM, EEPROM, or Flash), and random-access memories (RAMs). One of the processor-accessible memories in the data storage system 210 can be a tangible non-transitory computer-readable storage medium, i.e., a non-transitory device or article of manufacture that participates in storing instructions that can be provided to processor 204 for execution. In some examples, one of the processor-accessible memories in the data storage system 210 can be a non-volatile memory in a Subscriber Identity Module (SIM) card.

In an example, data storage system 210 includes code memory 222, e.g., a RAM, and computer-readable medium (CRM) 224, e.g., a tangible computer-readable rotational storage device or medium such as a solid-state disk or hard drive. Computer program instructions are read into code memory 222 from CRM 224. Processor 204 then executes one or more sequences of the computer program instructions loaded into code memory 222, as a result performing process steps described herein. In this way, processor 204 carries out a computer implemented process. For example, steps of methods described herein, blocks of the flowchart illustrations or block diagrams herein, and combinations of those, can be implemented by computer program instructions. Code memory 222 can also store data, or can store only code.

In the illustrated example, systems 202 or 220 can be computing nodes in a cluster computing system, e.g., a cloud service or other cluster system ("computing cluster" or "cluster") having several discrete computing nodes (systems 202, 220) that work together to accomplish a computing task assigned to the cluster as a whole. In some examples, at least one of systems 202, 220 can be a client of a cluster and can submit jobs to the cluster and/or receive job results from the cluster. Nodes in the cluster can, e.g., share resources, balance load, increase performance, and/or provide fail-over support and/or redundancy. Additionally or alternatively, at least one of systems 202, 220 can communicate with the cluster, e.g., with a load-balancing or job-coordination device of the cluster, and the cluster or components thereof can route transmissions to individual nodes.

Some cluster-based systems can have all or a portion of the cluster deployed in the cloud. Cloud computing allows for computing resources to be provided as services rather than a deliverable product. For example, in a cloud-computing environment, resources such as computing power, software, information, and/or network connectivity are provided (for example, through a rental agreement) over a network, such as the Internet. As used herein, the term "computing" used with reference to computing clusters, nodes, and jobs refers generally to computation, data manipulation, and/or other programmatically-controlled operations. The term "resource" used with reference to clusters, nodes, and jobs refers generally to any commodity and/or service provided by the cluster for use by jobs. Resources can include processor cycles, disk space, random-access memory (RAM) space, network bandwidth (uplink, downlink, or both), prioritized network channels such as those used for communications with quality-of-service (QoS) guarantees, backup tape space and/or mounting/unmounting services, electrical power, etc.

Furthermore, various aspects herein may be embodied as computer program products including computer readable program code ("program code") stored on a computer readable medium, e.g., a tangible non-transitory computer storage medium or a communication medium. A computer storage medium can include tangible storage units such as volatile memory, nonvolatile memory, or other persistent or auxiliary computer storage media, removable and non-removable computer storage media implemented in any method or technology for storage of information such as computer-readable instructions, data structures, program modules, or other data. A computer storage medium can be manufactured as is conventional for such articles, e.g., by pressing a CD-ROM or electronically writing data into a Flash memory. In contrast to computer storage media, communication media may embody computer-readable instructions, data structures, program modules, or other data in a modulated data signal, such as a carrier wave or other transmission mechanism. As defined herein, computer storage media do not include communication media. That is, computer storage media do not include communications media consisting solely of a modulated data signal, a carrier wave, or a propagated signal, per se.

The program code includes computer program instructions that can be loaded into processor 204 (and possibly also other processors), and that, when loaded into processor 204, cause functions, acts, or operational steps of various aspects herein to be performed by processor 204 (or other processor). Computer program code for carrying out operations for various aspects described herein may be written in any combination of one or more programming language(s), and can be loaded from CRM 224 into code memory 222 for execution. The program code may execute, e.g., entirely on processor 204, partly on processor 204 and partly on a remote computer connected to network 212, or entirely on the remote computer.

In some examples, processor 204 and, if required, CRM 224 (or other components of data storage system 210), are referred to for brevity herein as a "control unit." For example, a control unit can include a CPU or DSP (processor 204) and instructions stored on CRM 224 and executable by that CPU or DSP to cause that CPU or DSP to perform functions described herein. Additionally or alternatively, a control unit can include an ASIC, FPGA, or other logic device(s) wired (physically or via blown fuses or logic-cell configuration data) to perform functions described herein. A control unit of the latter type may not require or include a CRM 224, but may still perform functions described herein.

Illustrative Techniques and Dataflows

FIGS. 3-9 show various examples of dataflows between a terminal 102, at least one component of a serving network 132, and at least one component of a home network 134. For brevity, operations or data transfers in FIGS. 3-9 are numbered beginning from 1 independently in each figure. The reuse of numbers through FIGS. 3-9 does not imply that the similarly-numbered operations or data transfers are the same operations or data transfer, unless expressly indicated. In FIGS. 3-9, "*" (star) marks an encrypted value and ":" (colon) denotes concatenation. Values shown as concatenated can be concatenated in any order, and can be packed or interleaved in addition to or instead of being adjoined as indivisible units. Moreover, any numbered operation or data transfer can be performed using multiple coordinated operations or data transfers, respectively.

In some nonlimiting examples, the connection between terminal 102 and serving network 132 is wireless, and the connection between serving network 132 and home network 134 is wired. The illustrated examples show a roaming configuration. However, similar exchanges take place in a non-roaming configuration, in which the exchanges shown associated with serving network 132 are also performed by home network 134. This document expressly contemplates methods at each of terminal 102, serving network 132, and home network 134 for conducting the illustrated data exchanges and operations.

Throughout FIGS. 5-9 and the following discussion, the symbol "R" refers to at least one transaction-specific value ("TSV"), e.g., at least one cryptographic nonce or salt value. An R value as described herein can be, e.g., a cryptographically-strong random number or other random value. As used herein, a "random" value can be a truly random value or a pseudorandom value. In some examples, a TSV can be or include a data value (e.g., a random number) that does not have the same value for multiple consecutive transactions of a particular type. Using TSVs can reduce the chance of replay attacks or known-plaintext attacks.

In some examples, any encryption ("*") operation herein can include R value(s) (e.g., nonce(s)) or other techniques for preventing replay attacks. Any encryption operation of more than one value ("*($\alpha_1, \ldots, \alpha_n$)") can additionally or alternatively be performed as separate encryptions of at least one of those values (e.g., "(*$\alpha_1, \ldots,$ *$\alpha_n$)").

Figure 3:
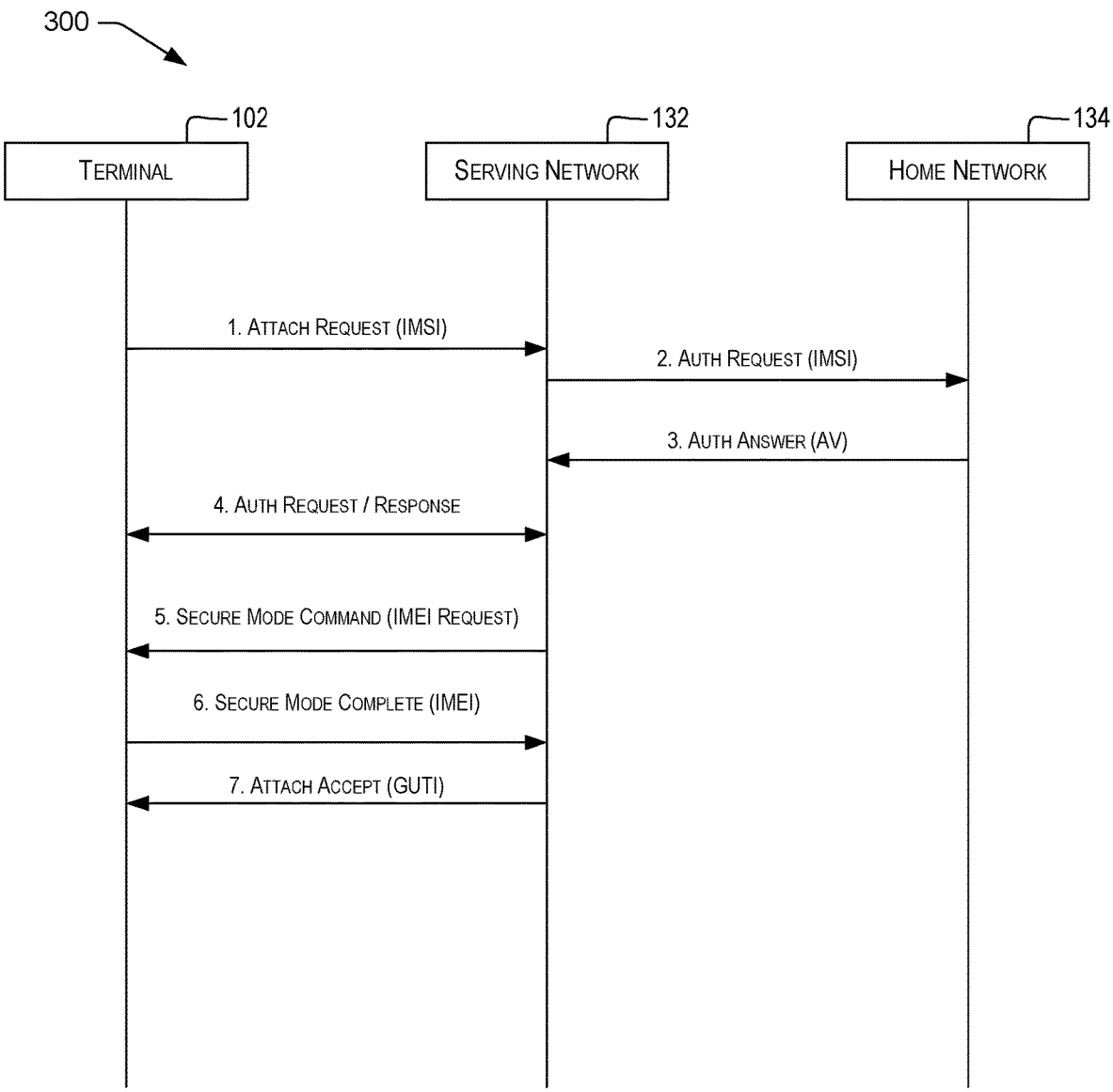
FIG. 3 shows a call flow of an attach procedure according to some prior schemes.

FIG. 3 shows a prior scheme 300 in which the IMSI is sent in the clear in an attach request (#1) from terminal 102 to serving network 132. Serving network 132 transmits a corresponding authentication request (#2) (e.g., an EPS authentication data request) to home network 134, which responds with an authentication answer (#3) (e.g., an EPS authentication data response) containing an authentication vector (AV). Home network 134 determines the AV based at least in part on the provided IMSL In some examples, home network 134 determines the AV based at least in part on an ID of serving network 132.

Serving network 132 then conducts an authentication request/response exchange (#4) with terminal 102 using on the AV. Exchange #4 can include, e.g., a Non-Access Stratum (NAS) Authentication Request from an MME 110 of serving network 132 to terminal 102, and an NAS Authentication Response from terminal 102 to the MME 110. When exchange #4 is completed successfully, serving network 132 issues an NAS Security Mode command (#5) requesting the IMEI (or IMEISV) of terminal 102. Terminal 102 responds with an NAS Security Mode Complete message (#6) including the IMEI (or IMEISV). After #6, NAS signaling is cryptographically protected against interference. Serving network 132 then sends an Attach Accept message (#7) to complete the attach procedure. The Attach Accept message (#7) includes a Globally Unique Temporary ID (GUTI) identifying terminal 102 while terminal 102 is attached to serving network 132.

In some examples, at the serving network 132's option, messages #5 and #6 may not be exchanged, and terminal 102 may not provide its IMEI to serving network 132. In other examples, terminal 102 may not provide the IMEI in message #6. Therefore, in some prior schemes the IMEI may never be verified, permitting use of a valid IMSI on a stolen phone. In other examples, the IMSI is verified through messages #1-#4, and the IMEI is independently validated through messages #5 and #6 (e.g., checked against an IMEI blacklist listing terminals known to be stolen). Since the IMSI and IMEI are not cross-checked, a valid IMSI can be used on a stolen phone with a valid IMEI. Furthermore, some examples of the depicted scheme permit IMSI catcher 128(b) to sniff the cleartext IMSI from #1, or to sniff the cleartext IMEI from #6. For example, messages #5 and #6 may not be encrypted, e.g., for emergency calls.

Figure 4:
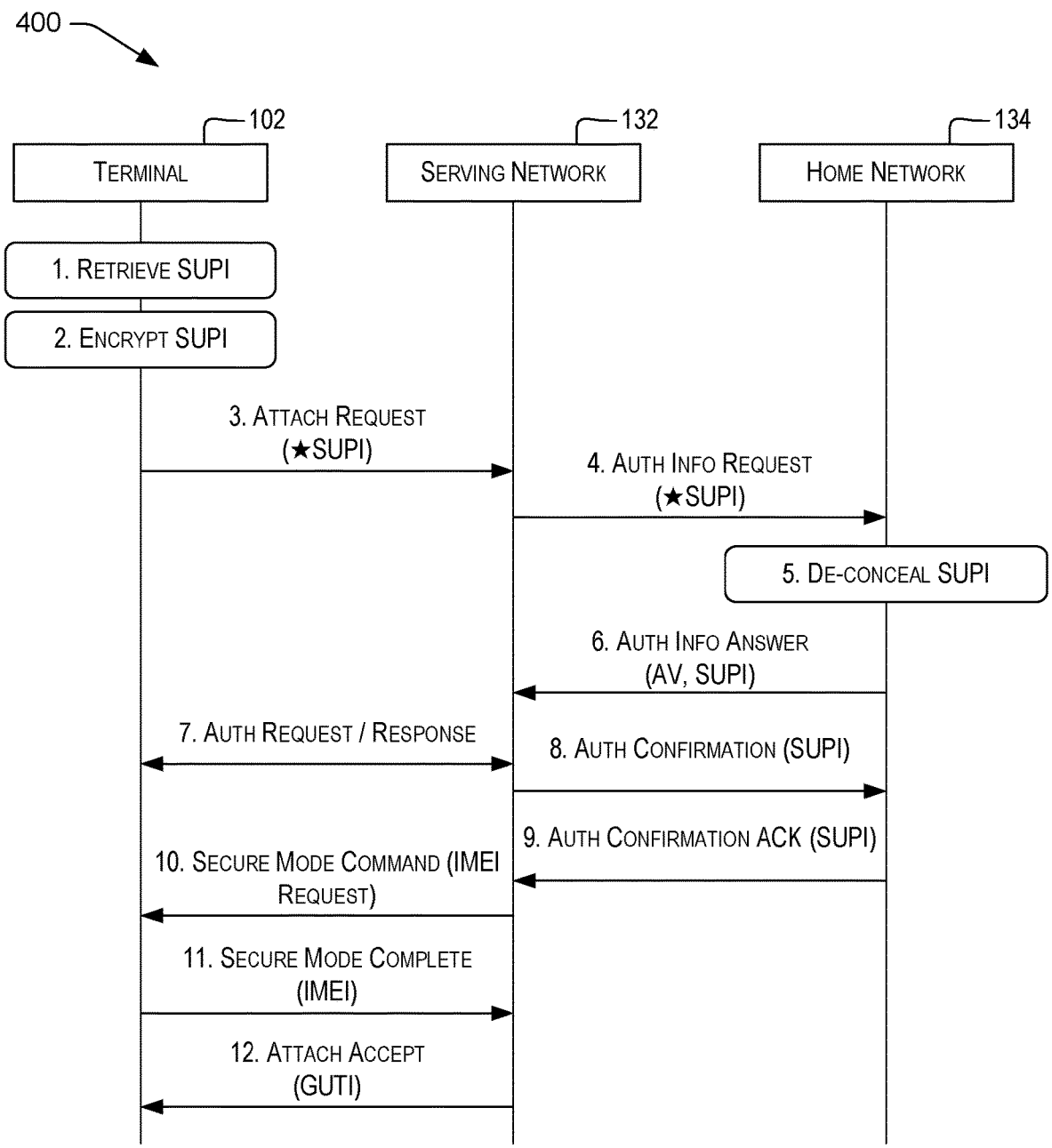
FIG. 4 shows a call flow of another attach procedure.

FIG. 4 shows another scheme 400 in which SUPI is encrypted initially (operations #1 and #2, which may be combined). In some examples, SUPIs or other subscriber identifiers (SIDs) can include IMSIs or other subscriber identifiers. In some examples, Terminal_IDs or other terminal identifiers (TIDs) can include IMEIs, network-adapter MAC addresses, or other equipment identifiers.

For example, some 5G schemes encrypt the SUPI (#2) before transmitting it in the attach request (#3). Therefore, neither IMSI catcher 128(b) nor serving network 132 can access the SUPI before it is decrypted by the home network (#5). However, home network 134 still provides the SUPI to serving network 132 (#6) to permit authentication request/response exchange (#7) to take place. Therefore, serving network 132 has access to the SUPI.

After exchange #7 succeeds, serving network 132 and home network 134 exchange an authentication confirmation (#8) and acknowledgement (#9) so that home network 134 is aware that the authentication was successful. Serving network 132 then exchanges NAS Security Mode messages #10 and #11 with terminal 102 and accepts the attach (#12), as discussed herein with reference to FIG. 4 #5-#7. However, the IMEI may still exchanged in the clear in #10 and #11.

In some 5G examples, the SUPI is asymmetrically encrypted at #2 with the public key of home network 134. This permits home network 134 to decrypt the SUPI, but not serving network 132.

FIGS. 5-9 show various examples of increasing security compared to FIGS. 3 and 4. Some described examples also provide increased protection against malicious network nodes that are trying to collect AVs and other PII, as described below. Various examples can be used for 4G or 5G networks, or for future IP-based networks having corresponding message exchanges. For brevity, some examples are illustrated in the context of 5G systems.

Figure 5:
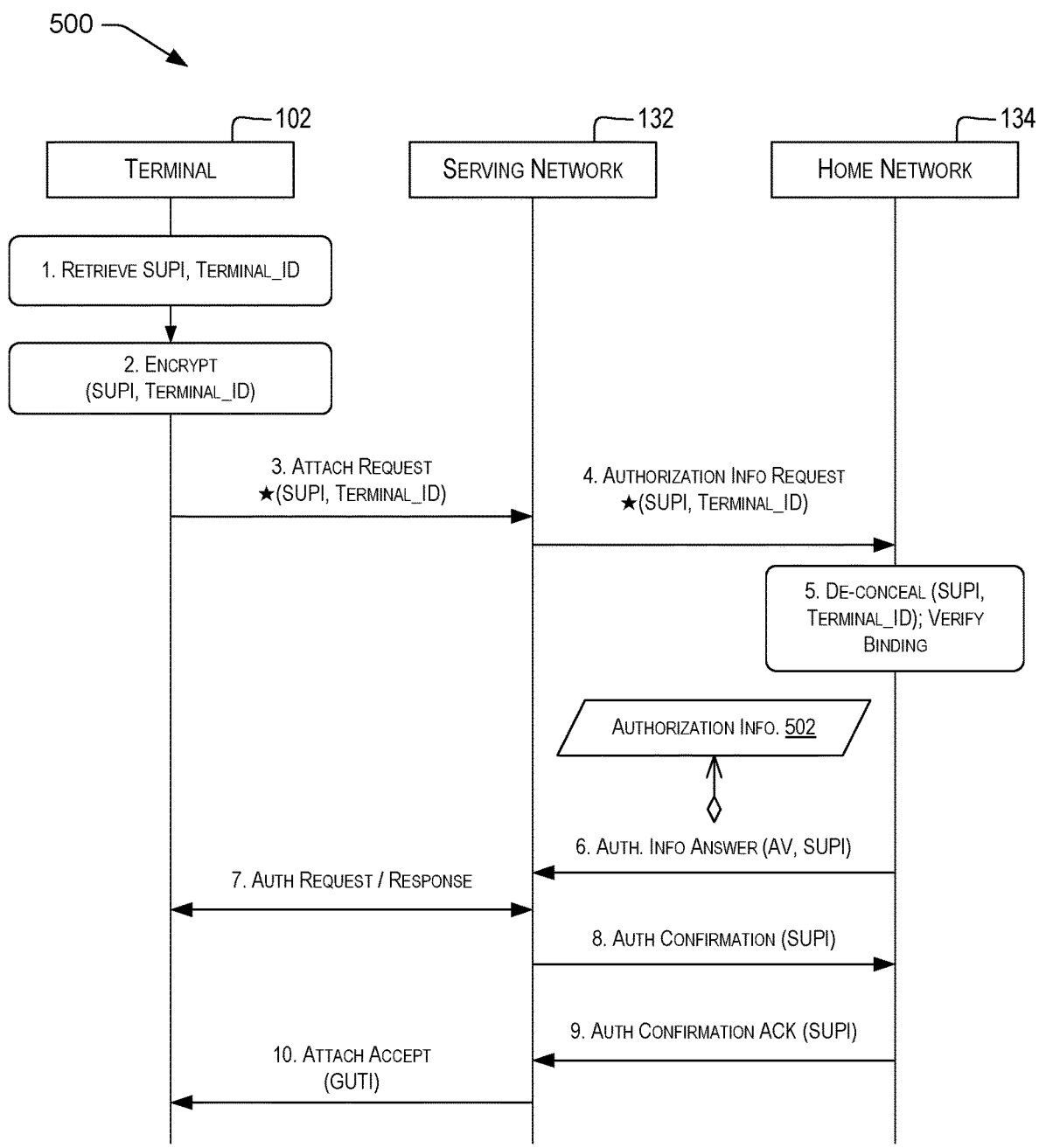
FIG. 5 shows a call flow of an example attach procedure including verification by a home network that a subscriber ID (SUPI) and a terminal ID (Terminal_ID) are authorized for joint use.

FIG. 5 shows an example 500 in which the Terminal_ID (e.g., IMEI) is never sent wirelessly in the clear. In some examples, the serving network does not receive the Terminal_ID, protecting user privacy by making it more difficult for malicious serving networks to track particular terminals.

In operation #2 (or #1 combined with #2), terminal 102 encrypts the SUPI (an example of a subscriber identifier, SID) and the Terminal_ID (an example of a terminal identifier, TID) with a public key of home network 134. Terminal 102 includes the encrypted values in attach request #3 to serving network 132. Serving network 132 forwards the encrypted values in authorization-information request #4 to home network 134. In other examples, symmetric encryption is used based on keys pre-shared between terminal 102 and home network 134, or determined using Diffie-Hellman or another key-exchange protocol. In some examples, authorization-information request #4 comprises at least a portion of an EPS authentication data request, e.g., a portion not including a cleartext SUPI or Terminal_ID.

At #5, home network 134 de-conceals, e.g., decrypts, the encrypted data from message #4 to determine the SUPI and Terminal_ID. Home network 134 then checks a database or other data source, e.g., in or of HLR/HSS 122 or another Authentication Centre (AuC), to determine whether or not the given Terminal_ID is authorized for use in association with the given SUPI. An indication of such authorization is referred to for brevity as a "binding": if the given Terminal_ID is bound to the given SUPI (or, equivalently, vice versa), the SUPI and the Terminal_ID are authorized for joint use. Examples are discussed herein, e.g., with reference to blocks 1104-1108.

If the use is authorized, home network 134 transmits authorization information 502 in authorization information answer #6 to serving network 132. For example, the authorization information 502 can include an EPS authentication vector or portion thereof, e.g., a random number (RAND), authentication token (AUTN), expected response (XRES), or access security management entity key ($K_{ASME}$). Additionally or alternatively, the authorization information 502 can include a SUPI, PEI, or other identifier associated with terminal 102. Additionally or alternatively, the authorization information 502 can include a key, ticket, token, or other data granting permission to communicate with terminal 102.

In the illustrated example, message #6 includes the SUPI so that serving network 132 can perform the authentication exchange #7 with terminal 102, as in FIG. 4 #7. Messages #8 and #9 can be as described herein with reference to FIG. 4 #8 and #9. Message #8 can be an example of a confirmation message. Home network 134 can confirm the attach to serving network 132 via message #9, which can include a SID, a TID, or both. Serving network 132 can then transmit the attach accept (#10) to terminal 102, e.g., as in FIG. 4 #12.

In the illustrated example, neither the SUPI nor the Terminal_ID is transmitted wirelessly in the clear. This prevents sniffing of those values by passive IMSI catcher 128(*b*). Moreover, the binding between the SUPI and the Terminal_ID is verified by home network 134, thereby reducing the chance that a stolen terminal can be used or that a terminal can be used in an unauthorized manner (e.g., using a different SIM card than that known to be associated with the terminal). Moreover, in the illustrated example, serving network 132 does not receive the Terminal_ID. This can increase user privacy by reducing the chance that a malicious or compromised serving network 132 will track Terminal_IDs.

Figure 6:
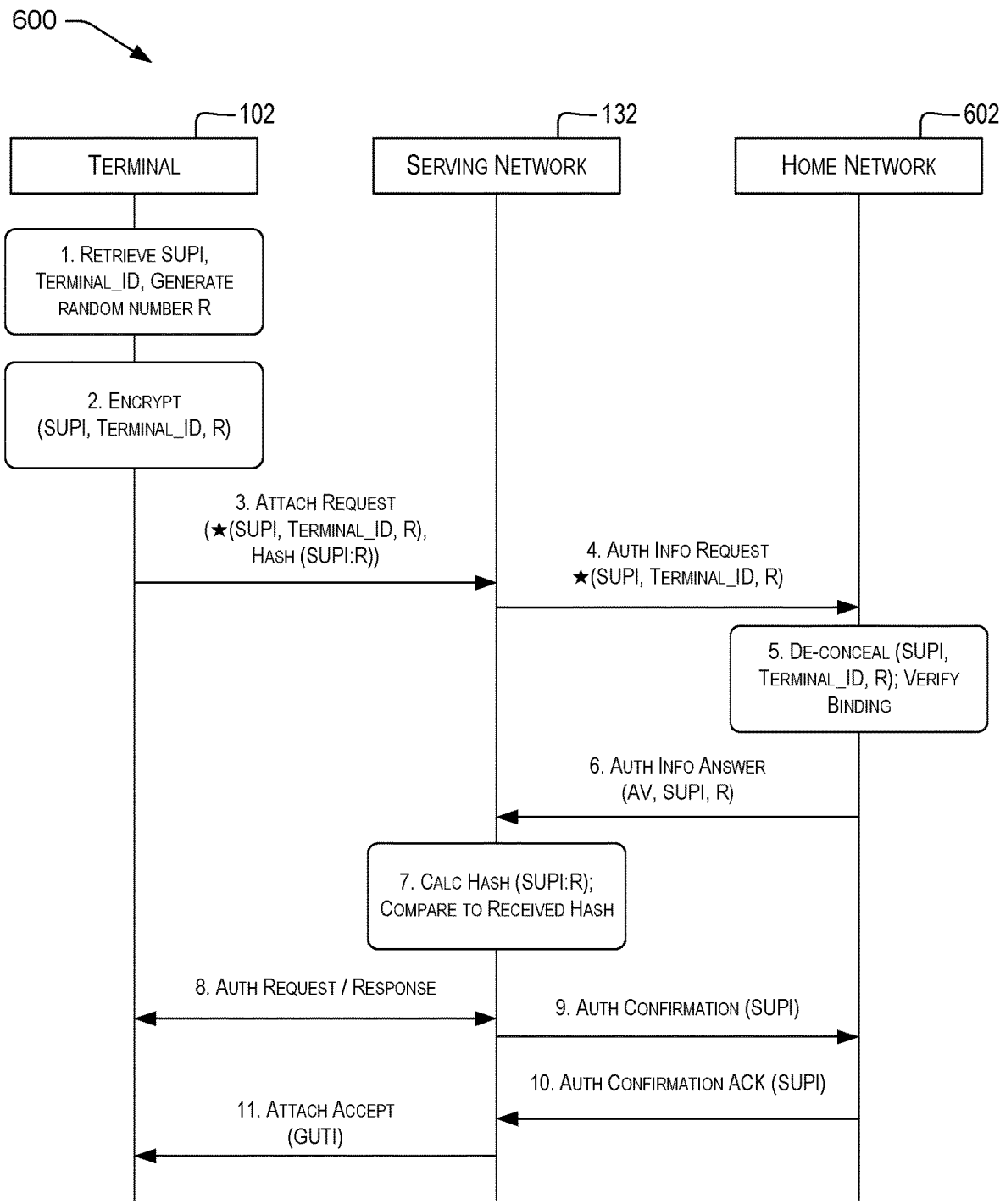
FIG. 6 shows a call flow of an example attach procedure including verification by a serving network that the home network is accurately reporting a subscriber ID.

FIG. 6 shows another example 600 that withholds the Terminal_ID from serving network 132. Example 600 can increase network security in the face of a malicious home network 602, e.g., under the control of a malicious state actor. However, the illustrated sequence of operations can additionally or alternatively be used with a non-malicious home network 134. In some examples, malicious home network 602 may not verify the binding at operation #5, whereas a non-malicious home network 134 may verify the binding.

At operation #1, terminal 102 generates a value R, e.g., a TSV such as a cryptographic nonce, as discussed above. At operation #2, terminal 102 encrypts the SUPI, the Terminal_ID, and the R value. Terminal 102 transmits the encrypted values in message #3. Terminal 102 also transmits a cryptographic hash, e.g., a SHA-512 hash, of the SUPI and the R value. In the illustrated example, a single R value is generated at #2. However, this is not limiting. Throughout the remainder of this disclosure, "R" can represent one or more TSVs.

Serving network 132 saves the R value from message #3. Serving network 132 sends the encrypted SUPI, Terminal_ID, and R value to home network 602 (authorization information request #4). Home network 602 then decrypts the SUPI, Terminal_ID, and R value. Home network 602 may check whether there is a binding between the SUPI and the Terminal_ID, e.g., as discussed herein with reference to FIG. 5 #5. If there is a binding, home network 602 transmits to serving network 132 an AV, the SUPI, and the R value (authorization information answer #6, e.g., including authorization information 502). In some examples, home network 602 does not transmit the Terminal_ID.

At #7, serving network 132 computes a hash of the SUPI and R values received from home network 602. Serving network 132 verifies the received SUPI by comparing the computed hash with the hash received in the attach request (#3). If the hashes do not match, serving network 132 can determine that at least some information from home network 602 in #6 is incorrect. In some examples, if verification fails at #7, the serving network can choose whether to accept or reject the attach, e.g., based on information in a configuration-data source (e.g., policy information). The attach can be rejected, e.g., as specified in the LTE or 5G standards. If verification succeeds, serving network 132 can proceed with authentication exchange #8 as in FIG. 5 #7.

In the illustrated example, *(SUPI, Terminal_ID, R) is an example of identification data including encrypted data of a SID (the SUPI, in this example) and a TID (the Terminal_ID, in this example). Hash(SUPI:R) is an example of verification data that can be used to confirm that malicious home network 602 is not mis-reporting the SID in message #6. The SUPI provided in message #6 is an example of identity data associated with the network terminal 102. Identity data can include a SID, a TID, or, as in FIGS. 7 and 8, both a SID and a TID.

Figure 7:
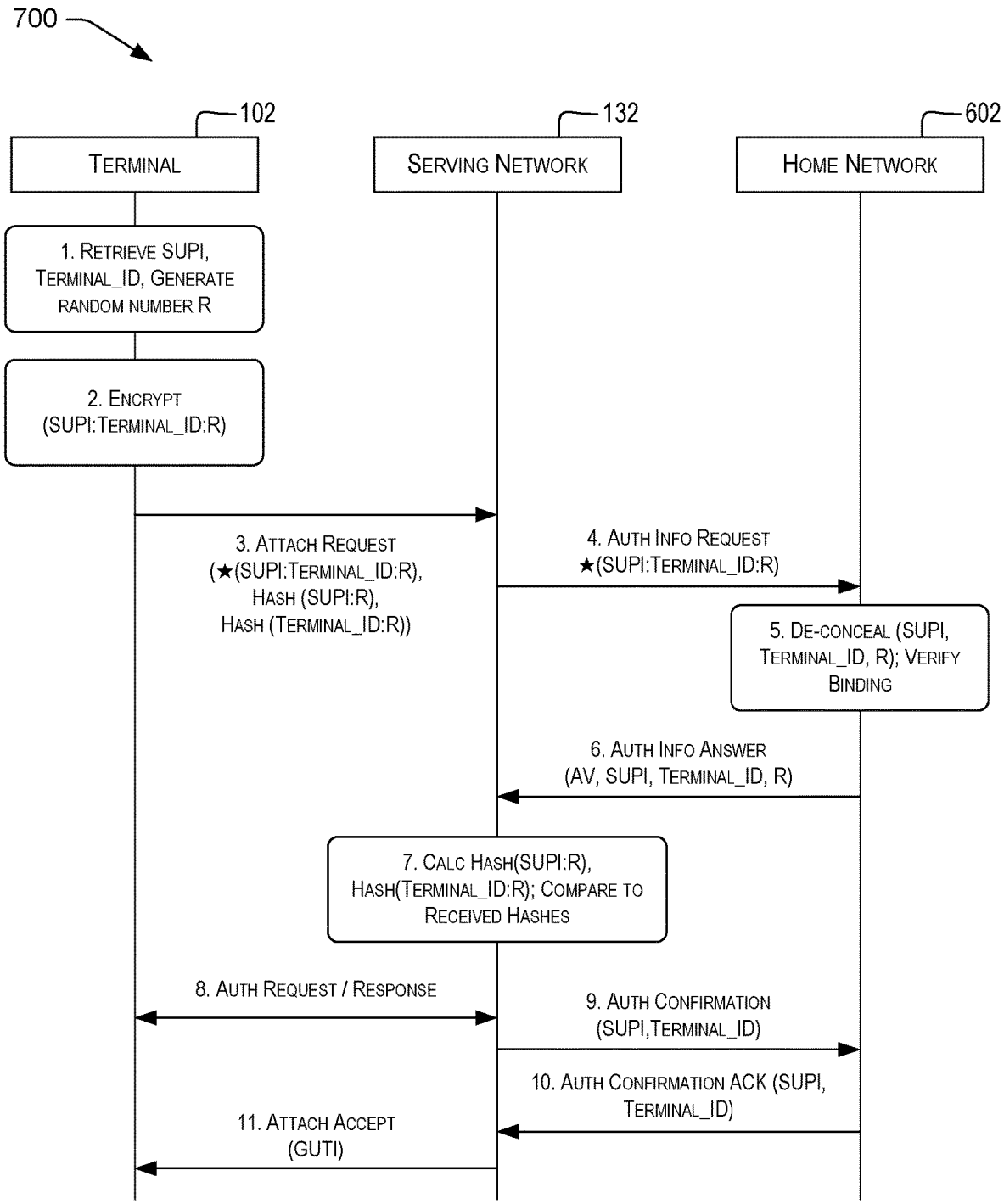
FIG. 7 shows a call flow of an example attach procedure including verification by a serving network that the home network is accurately reporting a subscriber ID and a terminal ID.

FIG. 7 shows an example 700 in which home network 602 provides serving network 132 both the SUPI and the Terminal_ID, and serving network 132 can verify both the SUPI and the Terminal_ID. This can increase the security of serving network 132 in the face of a malicious home network 602. Operations #1 and #2 can be as discussed herein with reference to FIG. 6 #1 and #2. In the illustrated example, the TSV R is referenced with respect to hashing both the SUPI and the Terminal_ID. However, as R can represent more than one TSV, one nonce can be used in hashing the SUPI and the Terminal_ID, or two separate nonces can be used in hashing the SUPI and the Terminal_ID, respectively.

Terminal 102 can send serving network 132 an attach request (#3) including the encrypted data from #2, and also including at least one hash. The at least one hash covers the SUPI, the Terminal_ID, and the R value (determined at #1). In the depicted example, message #3 includes two hashes: one of SUPI:R and one of Terminal_ID:R. Additionally or alternatively, message #3 can include a single hash of SUPI:Terminal_ID:R. As noted above, one or more R values can be used (e.g., a first R value for hashing the SUPI and a second R value for hashing the Terminal_ID). Authorization information request #4 can be as discussed herein with reference to FIG. 6 #4.

At operation #5, e.g., as discussed herein with reference to FIG. 6 #5, home network 602 can decrypt the information in message #4 and verify the binding between the SUPI and the Terminal_ID. Home network 602 can then transmit authorization information answer #6 (e.g., including authorization information 502) to serving network 132. Message #6 can include the AV, the R value, and both the SUPI and the Terminal_ID.

At operation #7, serving network 132 can compute one or more hashes corresponding to the hashes included in message #3. Serving network 132 can verify the SUPI and Terminal_ID values by comparing the hash value(s) from #3 with the hash value(s) determined at #7. Verification failure can be handled as discussed herein with reference to FIG. 6.

After completion of authentication exchange #8 (e.g., as FIG. 6 #8), serving network 132 can transmit authorization confirmation message #9 to home network 602. Message #9 can include both the SUPI and the Terminal_ID for verification by home network 602. Authorization confirmation acknowledgement #10 can also include the SUPI and the Terminal_ID. Message #11 can be as FIG. 6 #11.

In the illustrated example, Hash(SUPI:R) and Hash(Terminal_ID:R) in message #3 are examples of first and second verification data, respectively. SUPI and Terminal_ID in message #6 are examples of first and second identity data, respectively.

Figure 8:
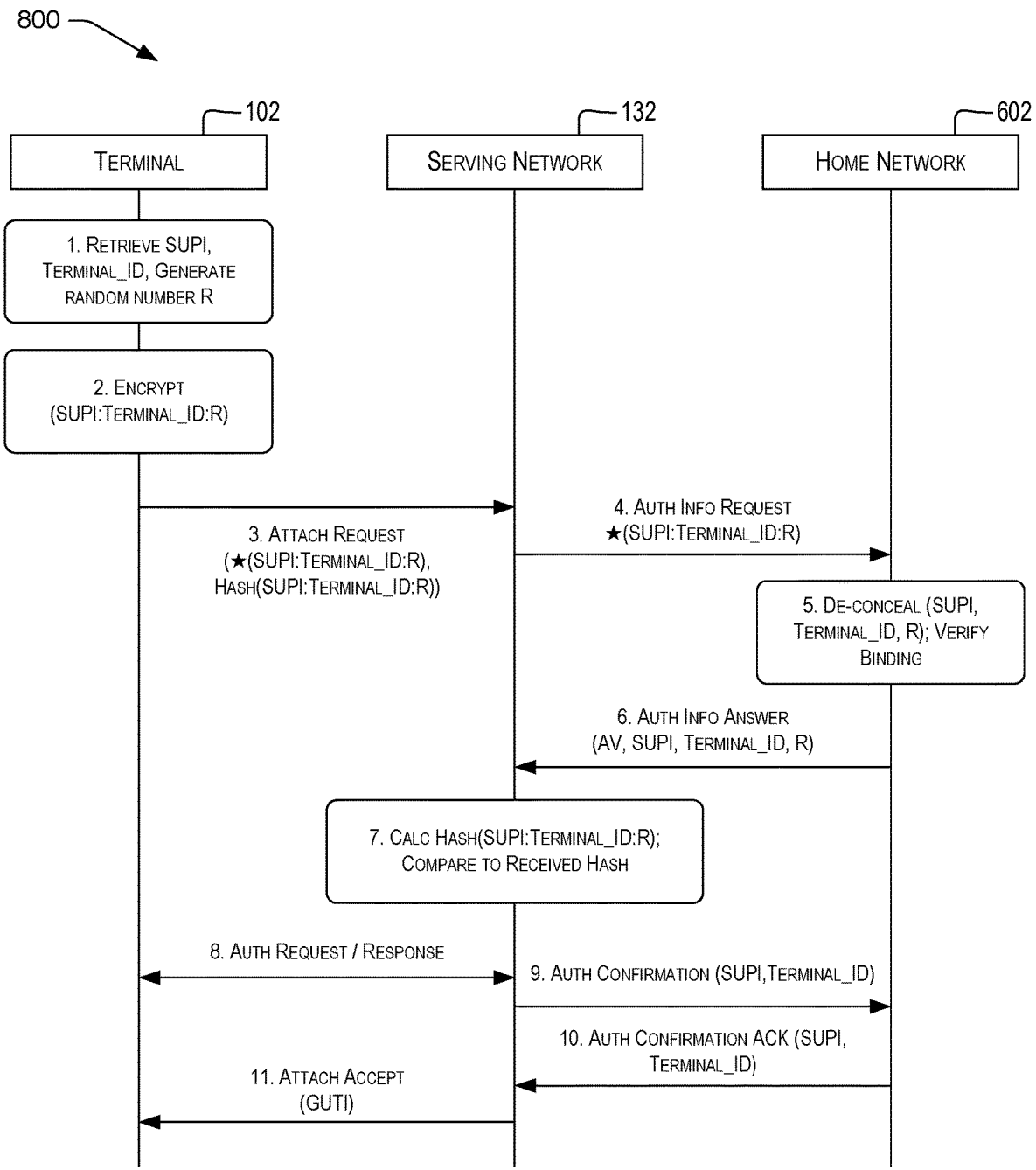
FIG. 8 shows a call flow of an example attach procedure including verification by a serving network that the home network is accurately reporting a subscriber ID and a terminal ID.

FIG. 8 shows another example 800 that increases security of serving network 132 in the face of a malicious home network 602. All the messages and operations are as discussed herein with reference to FIG. 7 except as noted.

Operation #2 and message #3 include a single combined hash of SUPI:Terminal_ID:R, rather than the separate SUPI:R and Terminal_ID:R hashes shown in FIG. 7. Operation #7 includes verifying, by serving network 132, the single combined hash.

Figure 9:
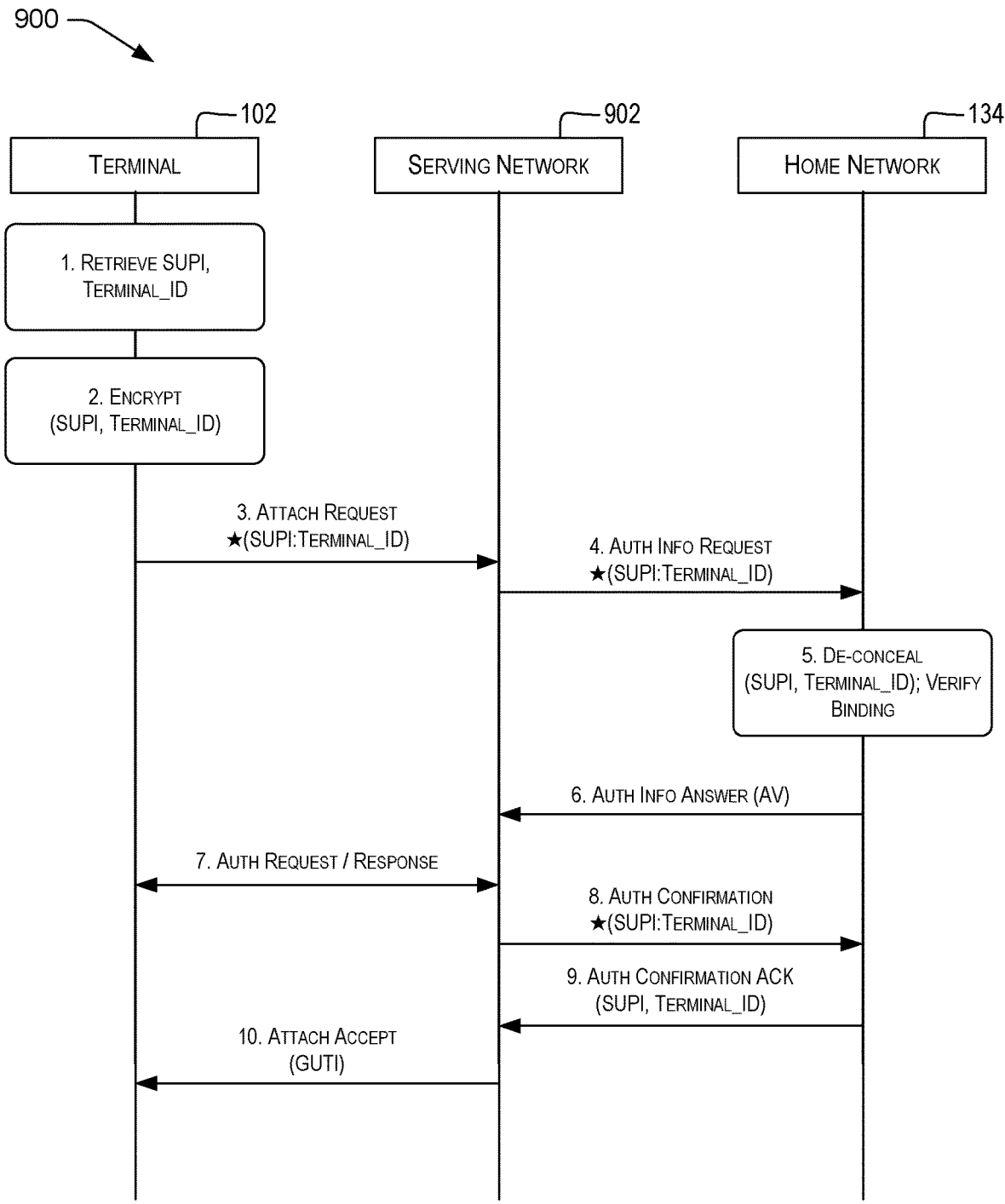
FIG. 9 shows a call flow of an example attach procedure including verification by a home network that the serving network is in communication with the terminal identified by the terminal ID.

FIG. 9 shows an example 900 in which home network 134 and terminal 102 cooperate to protect the user of terminal 102 from a rogue serving network (RSN) 902, i.e., a malicious serving network. Various techniques described with respect to this example can reduce the risk of a rogue serving network collecting subscriber and terminal identifiers (e.g., SUPIs and PEIs) and using this information to attack user privacy and confidentiality (e.g., using attach-request forwarding or failure-to-complete attacks). Reference is made below to FIGS. 4-8. The example of FIG. 9 provides additional security against specific types of breaches compared to FIGS. 4-8. However, various example network not substantially at risk of those specific types of breaches can use at least one of FIGS. 4-8. Nothing in the discussion of FIG. 9 should be construed to disparage FIGS. 4-8 in any way. Moreover, in some examples, techniques described with respect to FIG. 9 #6, #8, and #9 can be used with or in place of corresponding messages in any of FIGS. 5-8.

In some examples of an attach-request forwarding attack, an RSN 902 can, e.g., collect attach requests (e.g. FIGS. 4-8 #3), from various terminals 102. Via passive IMSI catchers 128(b), RSN 902 can also collect attach requests for terminals not trying to attach to RSN 902. RSN 902 can then send those sniffed attach requests as authorization information requests (e.g., FIGS. 4-8 #4) to home network 134. RSN 902 can then collect the decrypted SUPIs from home network 134 via corresponding authorization information answer messages (e.g., FIGS. 4-8 #6). This can permit RSN 902 to improperly determine SUPIs of the subscribers using the affected terminals.

In some examples of a failure-to-complete attack, RSN 902 can carry out procedures such as those in FIGS. 4-8 up through the authorization information answer (#6), e.g., with respect to terminals 102 attempting to attach to RSN 902. This can permit RSN 902 to determine the AV and SUPI of those terminals 102 (in FIGS. 4-8 #6). However, RSN 902 can discontinue or terminate the attachment process after #6. This is a form of DoS attack against terminals 102, and can permit RSN 902 to collect SUPIs from a large number of terminals, e.g., in a relatively short amount of time.

The example of FIG. 9 provides protection against attach-request forwarding and failure-to-complete attacks, such as collection by rogue serving networks of subscriber permanent identifiers, or falsely reporting to home network 134 the presence of a victim terminal 102 in RSN 902. In FIG. 9, home network 134 does decrypt the SUPI and Terminal_ID and verify the binding at #5, e.g., as FIGS. 5-8 #5. However, home network 134 does not send the SUPI to RSN 902 in authorization information answer #6. Message #6 can be an example of authorization information that does not include a SID, a TID, or both. Message #6, in the illustrated example, does include the AV, permitting RSN 902 to carry out authentication exchange #7 with terminal 102 (e.g., as FIG. 3 #4, FIGS. 4 and 5 #7, or FIGS. 6-8 #8). RSN 902 then sends confirmation message #8 to home network 134. Exchange #7 and corresponding information in message #8 are based at least partly on information known to terminal 102 and home network 134, but not known to RSN 902. For example, message #7 can include a challenge from home network 134, and a response from terminal 102, that are based on a secret shared between home network 134 and terminal 102. Similarly, in some examples, message #8 can include encrypted information (e.g., SUPI or Terminal_ID) provided by terminal 102. Therefore, RSN 902 cannot spoof #7 and #8. Moreover, RSN 902 cannot provide a correct message #8 to home network 134 if terminal 102 is not present and communicating with RSN 902 during exchange #7. In some examples not depicted, message #8 can exclude the encrypted SUPI and Terminal_ID. In some examples, the Diameter Session Identifier field or similar fields having common values across multiple messages can be used to associated #4, #6, and #8.

RSN 902 cannot determine the SUPI or Terminal_ID until they are provided by home network 134 in message #9. Therefore, RSN 902 cannot sniff data and retrieve decrypted SUPIs for any UE not actively connecting to the network via RSN 902. This significantly reduces the number of SUPIs RSN 902 can decrypt, which improves user privacy. Moving cleartext transmission of the SUPI and Terminal ID into the authentication confirmation acknowledgement (#9) mitigates against attacks against user privacy or confidentiality. Because RSN 902 cannot receive a SUPI without #7 and #8, this technique also limits the rate at which RSN 902 can request information from home network 134, reducing the severity of any DoS attack by RSN 902 against home network 134. However, example 900 can also be used with non-malicious serving networks 132, in which case the serving network 132 can transmit attach accept #10, e.g., as FIG. 5 #10.

Table 1 lists, in each row, operations, data transfers, or data exchanges that can be (but are not required to be) performed using techniques described herein with reference to any of the other items listed in each row. Table 1 does not require exact identity of data or operation. For example, attach request #3 of FIG. 5 can be performed using techniques discussed herein with reference to attach request #1 of FIG. 3 or attach request #3 of FIG. 4. However, as shown in FIG. 5, FIG. 3 #1 may not include an encrypted SUPI, while FIG. 5 #3 does include an encrypted SUPI ("*SUPI"). Similarly, operation #5 of FIG. 5 includes both decryption and binding verification. The decryption can be performed as discussed herein with reference to FIG. 4 #5, even though FIG. 4 does not show binding verification.

TABLE 1

| FIG. 3 | FIG. 4 | FIG. 5 | FIG. 6 | FIG. 7 | FIG. 8 | FIG. 9 |
|---|---|---|---|---|---|---|
|  | #1 | #1 | #1 | #1 | #1 | #1 |
|  | #2 | #2 | #2 | #2 | #2 | #2 |
| #1 | #3 | #3 | #3 | #3 | #3 | #3 |
| #2 | #4 | #4 | #4 | #4 | #4 | #4 |
|  | #5 (decryption) | #5 | #5 | #5 | #5 | #5 |
|  |  | #5 (binding verification) | #5 | #5 | #5 | #5 |
| #3 | #6 | #6 | #6 | #6 | #6 | #6 |
|  |  |  | #7 | #7 | #7 |  |
| #4 | #7 | #7 | #8 | #8 | #8 | #7 |
|  | #8 | #8 | #9 | #9 | #9 | #8 |
|  | #9 | #9 | #10 | #10 | #10 | #9 |

TABLE 1-continued

| FIG. 3 | FIG. 4 | FIG. 5 | FIG. 6 | FIG. 7 | FIG. 8 | FIG. 9 |
|---|---|---|---|---|---|---|
| #5 | #10 | | | | | |
| #6 | #11 | | | | | |
| #7 | #12 | #10 | #11 | #11 | #11 | #10 |

Illustrative Processes

Figure 10:
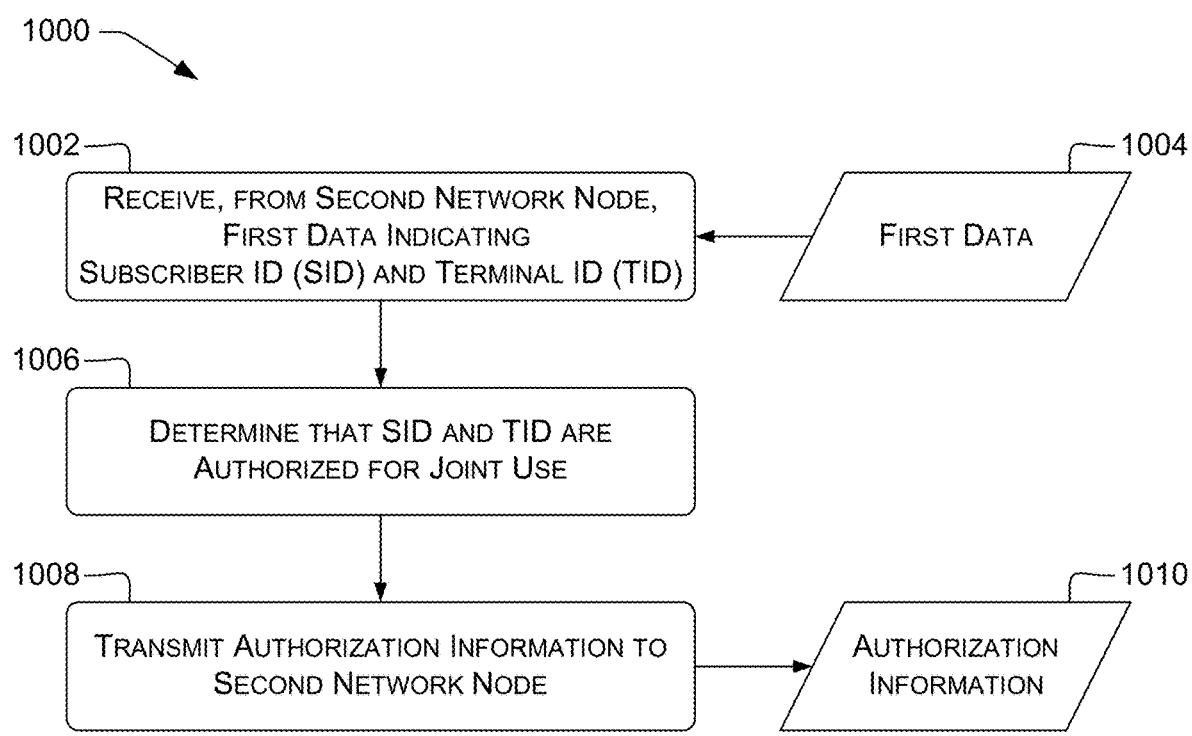
FIG. 10 is a dataflow diagram of an example process for controlling access to a network.

FIG. 10 is a dataflow diagram illustrating an example process 1000 for controlling access to a network, and related data items. Process 1000 can be performed, e.g., by a network node of home network 134, e.g., an HLR/HSS 122. The network node can communicate with a terminal 102, 130; devices of a serving network 132; or other devices participating in telecommunications architecture 100. In some examples, the network node includes a control unit. For example, the network node can include one or more processors (e.g., processor 204) configured to perform operations described below, e.g., in response to computer program instructions stored in data storage system 210.

Operations shown in FIG. 10 and in FIGS. 11-18, discussed below, can be performed in any order except when otherwise specified, or when data from an earlier step is used in a later step. For clarity of explanation, reference is herein made to various components shown in FIGS. 1 and 2, or to operations shown in FIGS. 3-9, that can carry out or participate in the steps of the exemplary method, and to various operations and messages shown in FIGS. 3-9 that can occur while the exemplary method is carried out or as part of the exemplary method. It should be noted, however, that other components can be used; that is, exemplary method(s) shown in FIGS. 10-18 are not limited to being carried out by the identified components, and are not limited to including the identified operations or messages.

At 1002, the network node can receive, from a second network node (e.g., an MME) associated with an access network, first data 1004. The first data 1004 can indicate a subscriber identifier (SID) and a terminal identifier (TID). For example, the SID can comprise a Subscriber Permanent Identifier (SUPI). The TID can comprise an International Mobile Equipment Identity (IMEI). Examples are discussed herein, e.g., with reference to FIGS. 5-9 #3 and #4. The first data 1004 can be transmitted, e.g., as part of an attach request from or on behalf of a network terminal 102 or 130. Additionally or alternatively, the first data 1004 can be transmitted as part of an authorization data request (e.g., FIG. 5 #4) associated with an attach request (e.g., FIG. 5 #3).

At 1006, the network node can determine that the SID and TID are authorized for joint use. For example, the network node can verify a binding between the SID and the TID. Examples are discussed herein, e.g., with reference to FIGS. 5-9 #5. A binding can indicate that the subscriber identified by the SID is authorized to use the terminal identified by the TID. If the SID and the TID are bound, block 1006 can be followed by block 1008. Otherwise, the attach request or authorization data request can be rejected, e.g., as specified by the LTE standards. This can prevent access to the network by stolen or unauthorized terminals.

At 1008, in response to the determination of authorization at block 1006, the network node can transmit authorization information 1010 to the second network node. For example, the authorization information 1010, which can represent authorization information 502, can include an LTE or 5G authentication vector (AV). Examples are discussed herein, e.g., with reference to FIGS. 5-9 #6. The authorization information 1010 can, e.g., permit an attach process to continue at serving network 132 past FIGS. 5-9 #4.

Figure 11:
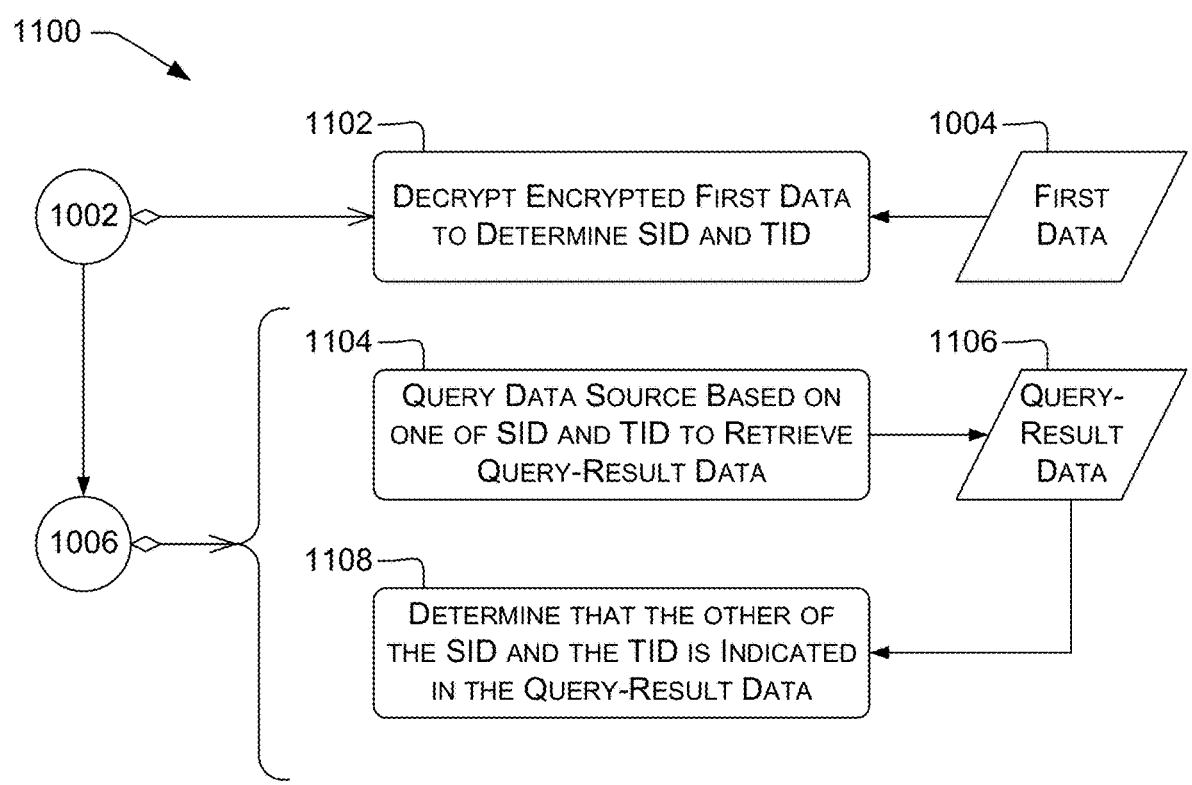
FIG. 11 is a dataflow diagram of an example process for controlling access to a network, including verifying authorization for joint use.

FIG. 11 illustrates an example process 1100 for controlling access to a network, and related data items. The illustrated process 1100 can be carried out by a control unit, e.g., of a network node associated with home network 134. In some examples, block 1002 can include block 1102. In some examples, block 1006 can include blocks 1104 and 1108.

At 1102, the network node can perform decryption. In some examples, the first data 1004 comprises encrypted data. Block 1102 can include decrypting the encrypted data to determine the SID and the TID. For example, the first data 1004 can include data encrypted with a public key of the home network 134. Block 1102 can include decrypting the first data 1004 with the corresponding private key to determine the SID and the TID. Examples are discussed herein, e.g., with reference to FIGS. 5-9 #5.

At 1104, the network node can query a data source based at least in part on one of the SID and the TID to retrieve query-result data 1106. The data source can be or include, e.g., a local database stored at the network node; a remote database; or another network node. In examples in which process 1100 is not carried out on HLR/HSS 122, the data source can be or include HLR/HSS 122.

At 1108, the network node can determine that the other of the SID and the TID (the one not indicated in the query) is indicated in the query-result data 1106. For example, if the query at block 1104 was based on the SID, block 1108 can include determining that the TID is indicated in the query-result data 1106, and vice versa.

Figure 12:
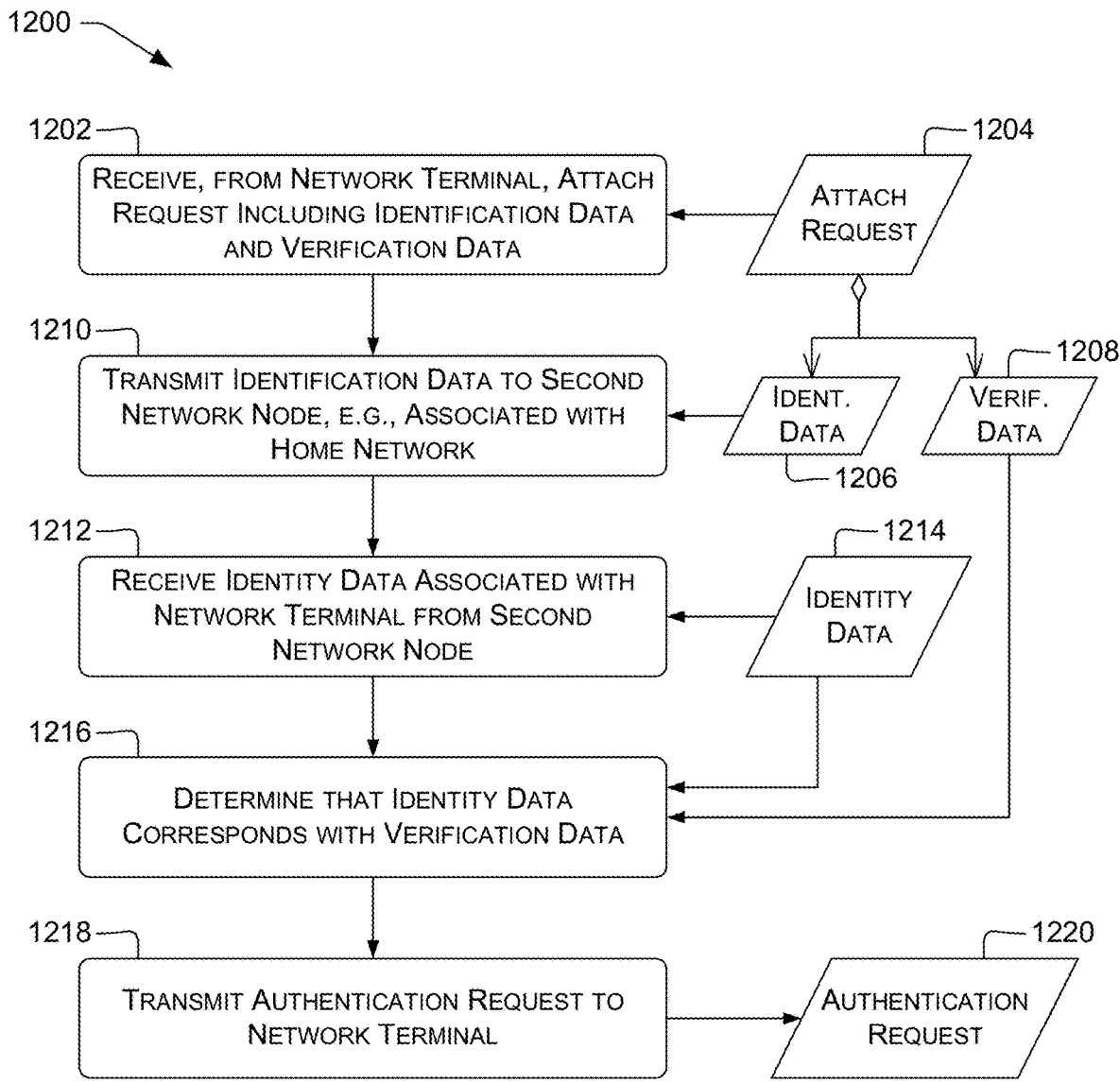
FIG. 12 is a dataflow diagram of an example process for controlling access to a network, e.g., at a serving network.

FIG. 12 is a dataflow diagram illustrating an example process 1200 for controlling access to a network, and related data items. Process 1200 can be performed, e.g., by a network node of serving network 132, e.g., an MME 110. The network node can be associated with an access network, e.g., an EPC network. The network node can communicate with a terminal 102, 130; devices of a home network 134; or other devices participating in telecommunications architecture 100. The network node can include a communications interface 216 permitting the network node to communicate with devices in architecture 100. In some examples, the network node includes a control unit. For example, the network node can include one or more processors (e.g., processor 204) configured to perform operations described below, e.g., in response to computer program instructions stored in data storage system 210.

At 1202, the network node can receive, from a network terminal 102, an attach request 1204 comprising identification data 1206 and verification data 1208. Examples are discussed herein, e.g., with reference to FIGS. 5-9 #3. For example, the identification data 1206 can include encrypted data, e.g., encrypted SUPI or Terminal_ID data. Verification data 1208 can include a cryptographic hash or other value usable by the network node as discussed below, e.g., Hash (SUPI).

At 1210, the network node can transmit, to a second network node, the identification data 1206. Examples are discussed herein, e.g., with reference to FIGS. 5-9 #4. The second network node, e.g., an HLR/HSS 122, can be associated with home network 134. In some examples, attach request 1204 includes other data not transmitted to the second network node at block 1210.

At 1212, the network node can receive, from the second network node, identity data 1214 associated with the network terminal. Examples are discussed herein, e.g., with reference to FIGS. 5-9 #6. The identity data 1214 can include at least one of a subscriber identifier (SID) and a terminal identifier (TID), e.g., decrypted from the identification data 1206. As noted above, the SID can include a Subscriber Permanent Identifier (SUPI); the TID can include an International Mobile Equipment Identity (IMEI); or both.

At 1216, the network node can determine that the identity data 1214 corresponds with the verification data 1208. Examples are discussed herein, e.g., with reference to FIGS. 6-8 #7. For example, the network node can determine a hash based at least in part on identity data 1214 and compare the hash to a hash in verification data 1208.

At 1218, the network node can, in response to the determination at block 1216, transmit an authentication request 1220 to the network terminal. Examples are discussed herein, e.g., with reference to FIG. 5 #7, FIGS. 6-8 #8, or FIG. 9 #7. For example, the authentication request 1220 can include an NAS Authentication Request message. Additionally or alternatively, the authentication request 1220 can include an authentication token (AUTN) or other information useful in establishing a secure wireless channel between terminal 102 and eNodeB 106, or between terminal 102 and MME 110. In some examples, the authentication request 1220 can include information from, or be determined based at least in part on, authorization information 502, 1010. For example, the network node can copy an AV from authorization information 502, 1010 into authentication request 1220.

Figure 13:
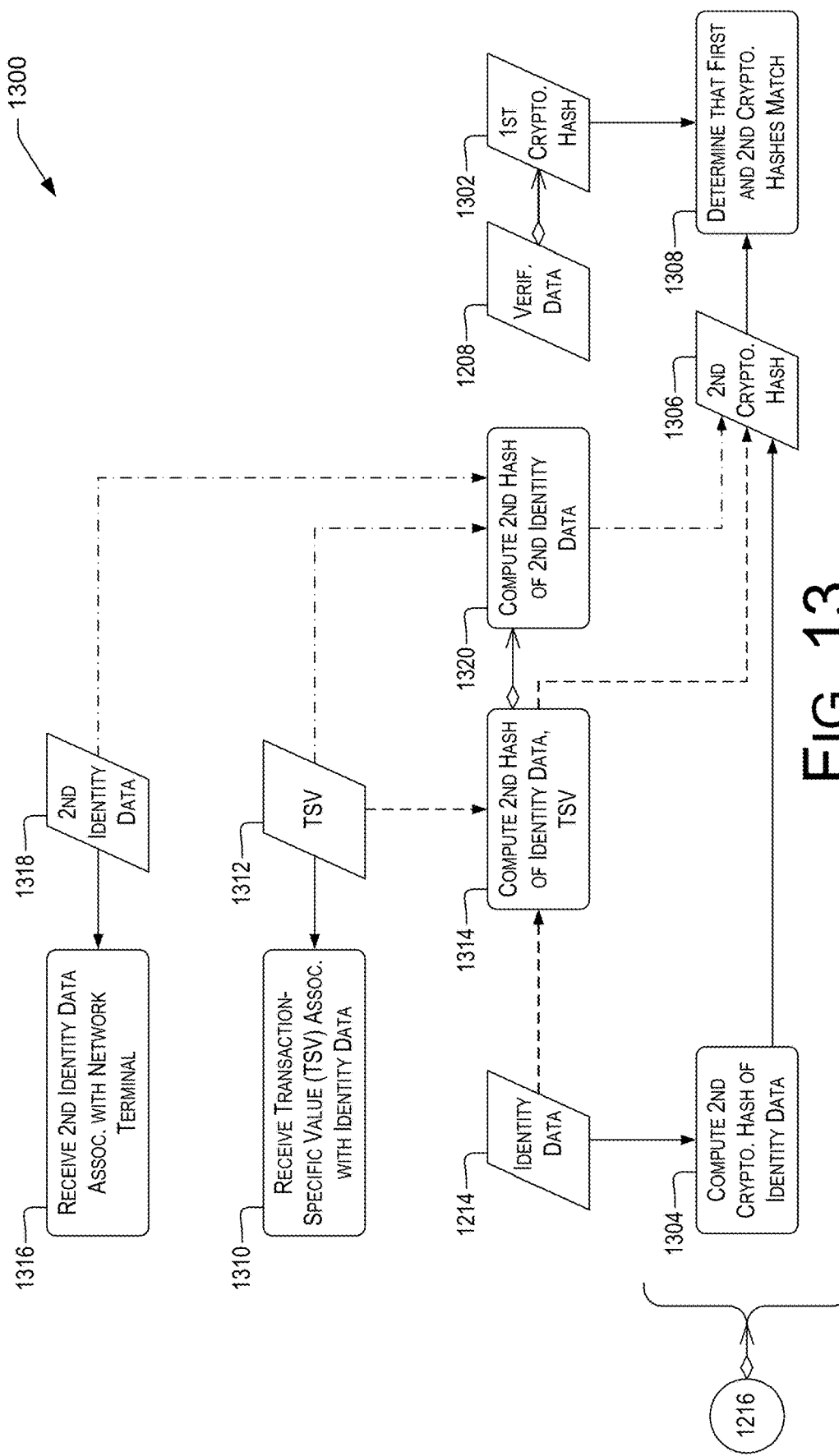
FIG. 13 is a dataflow diagram of an example process for verifying identity data, e.g., at a serving network.

FIG. 13 illustrates example processes 1300 for controlling access to a network, and related data items. The illustrated process 1300 can be carried out by a control unit, e.g., of a network node associated with serving network 132. In some examples, the verification data 1208 can include a first cryptographic hash 1302. In some examples, block 1216 can include blocks 1304 and 1308.

At 1304, the network node can compute a second cryptographic hash 1306 of at least the identity data 1214 received from the second network node. Examples are discussed herein, e.g., with reference to FIGS. 6-8 #7, e.g., Hash(SUPI) or Hash(Terminal_ID).

At 1308, the network node can determine that the second cryptographic hash 1306 matches the first cryptographic hash 1302. In response, the network node can determine (block 1216) that the identity data 1214 corresponds with the verification data 1208. This can increase the security of the network in the presence of a malicious or otherwise untrustworthy home network 602.

At 1310, the network node can receive, from the second network node, a transaction-specific value (TSV) 1312 associated with the identification data 1206. As noted above, the TSV can be a random number or other R value. Examples are discussed herein, e.g., with reference to FIGS. 6-8 #2 and #6.

At 1314, the network node can compute the second cryptographic hash 1306 further of at least the TSV 1312. The corresponding dataflow is indicated with dashed lines solely for clarity. Examples are discussed herein, e.g., with reference to FIGS. 6-8 #7, in which the R value (the TSV 1312) is included in the Hash( ) computation, e.g., Hash (SUPI:R).

At 1316, the network node can receive, from the second network node, second identity data 1318 associated with the network terminal 102. Examples are discussed herein, e.g., with reference to FIGS. 6-8 #6. For example, if the identity data 1214 includes a SUPI, the second identity data 1318 can include a Terminal_ID, or vice versa.

At 1320, the network node can compute the second cryptographic hash 1306 further of at least the second identity data 1318. Examples are discussed herein, e.g., with reference to FIGS. 6-8 #7 or FIG. 6 or 7 #3, e.g., Hash (SUPI:R). The corresponding dataflow is indicated with dash-dot lines solely for clarity.

In some examples (for brevity, not depicted), block 1314 can include or cooperate with block 1320. Block 1320 can include computing the second cryptographic hash 1306 of at least the identity data 1214 and the second identity data 1318. Examples are discussed herein, e.g., with reference to FIGS. 6-8 #7 or FIG. 8 #3, e.g., Hash (SUPI:Terminal_ID: R). Additionally or alternatively, the second cryptographic hash can be computed omitting TSV 1312, e.g., Hash(SUPI: Terminal_ID).

Figure 14:
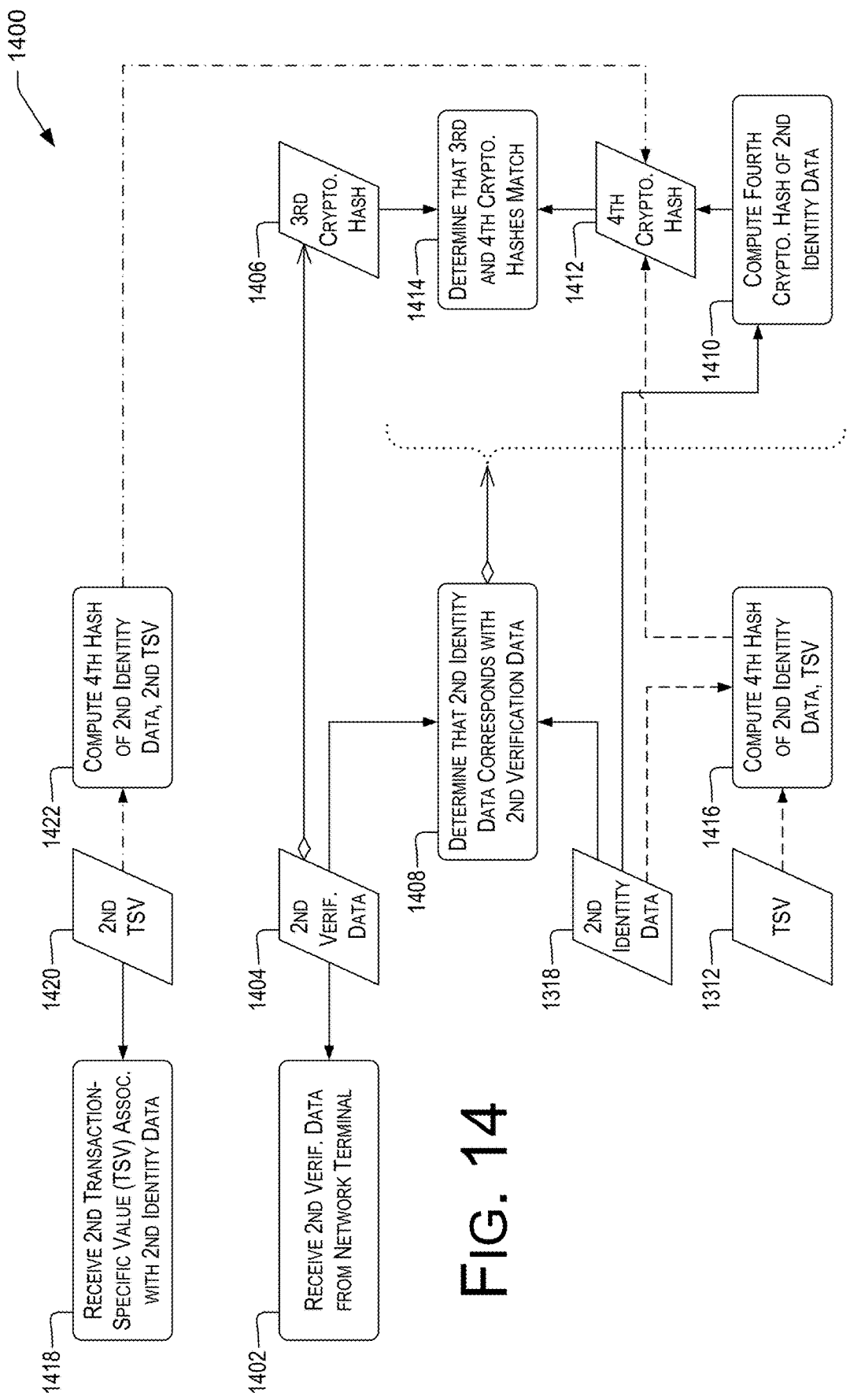
FIG. 14 is a dataflow diagram of an example process for verifying additional identity data, e.g., at a serving network.

FIG. 14 illustrates example processes 1400 for controlling access to a network, and related data items. The illustrated process 1400 can be carried out by a control unit, e.g., of a network node associated with serving network 132. In some examples, block 1310 can be followed by block 1416. In some examples, block 1316 can be followed by block 1408, 1410, or 1416.

At 1402, the network node can receive, from the network terminal 102, second verification data 1404. In some examples, the second verification data 1404 comprises a third cryptographic hash 1406. Examples are discussed herein, e.g., with reference to FIG. 7 #3.

At 1408, the network node can determine that the second identity data 1318 corresponds with the second verification data 1404. Examples are discussed herein, e.g., with reference to FIG. 7 #7. Block 1408 can be performed after receiving, from the second network node, at block 1316, the second identity data 1318 (e.g., a SUPI or Terminal_ID) associated with the network terminal 102. In some examples, block 1408 can include blocks 1410 and 1414.

At 1410, the network node can compute a fourth cryptographic hash 1412 of at least the second identity data 1318; and At 1414, the network node can determine that the fourth cryptographic hash 1412 matches the third cryptographic hash 1406.

At 1416, in some nonlimiting examples, the network node can compute the fourth cryptographic hash 1412 further of at least the TSV 1312. The corresponding dataflow is indicated with dashed lines solely for clarity. Examples are discussed herein, e.g., with reference to FIGS. 6-8 #2, #3, #6, and #7, in which a single R value is shown.

At 1418, the network node can receive, from the second network node, a second, different TSV 1420 associated with the second identity data 1318. Second TSV 1420 can be another R value.

At 1422, the network node can compute the fourth cryptographic hash 1412 further of at least the second TSV 1420. The corresponding dataflow is indicated with dash-dot lines solely for clarity. For example, block 1422 can be used with block 1314. In some examples, TSV 1312 is denoted $R_1$ and second TSV 1420 is denoted $R_2$. Block 1314 can include computing the second cryptographic hash 1306 as Hash (SUPI:R1) (or Hash(Terminal_ID:$R_1$)), and block 1422 can include computing the fourth cryptographic hash 1412 as Hash(Terminal_ID:$R_2$) (or, respectively, Hash(SUPI:$R_2$)).

Figure 15:
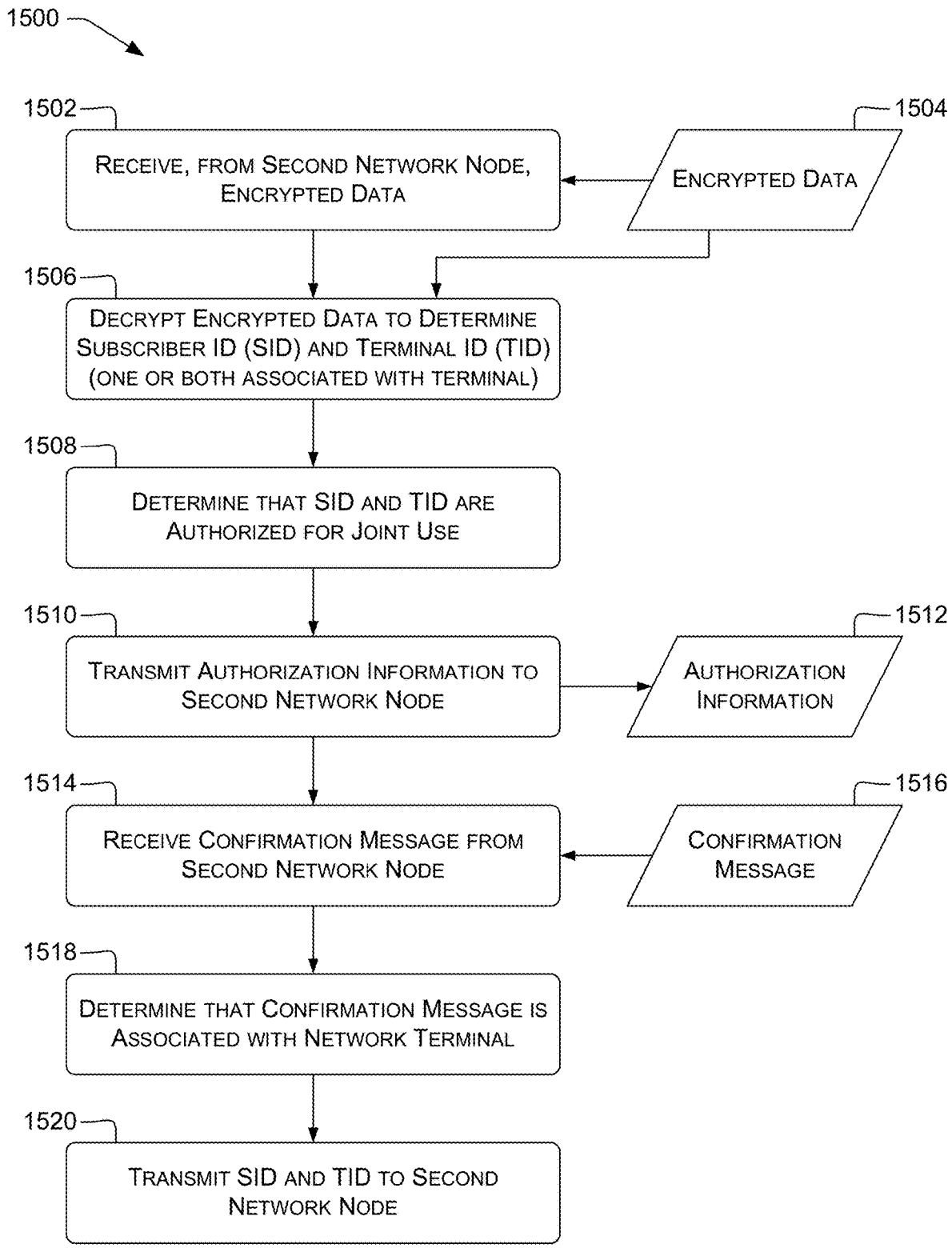
FIG. 15 is a dataflow diagram of an example process for validating communications with a terminal and a serving network, e.g., at a home network.

FIG. 15 is a dataflow diagram illustrating an example process 1500 for controlling access to a network, and related data items. Process 1500 can be performed, e.g., by a network node of home network 134, e.g., an HLR/HSS 122. The network node can communicate with a terminal 102, 130; devices of a serving network 132; or other devices participating in telecommunications architecture 100. The network node can include a communications interface 216 permitting the network node to communicate with devices in architecture 100. In some examples, the network node includes a control unit. For example, the network node can include one or more processors (e.g., processor 204) configured to perform operations described below, e.g., in response to computer program instructions stored in data storage system 210.

At 1502, the network node can receive, from a second network node associated with an access network, encrypted data 1504. Examples are discussed herein, e.g., with reference to FIGS. 5-9 #4. Further examples are discussed herein, e.g., with reference to blocks 1002 and 1102.

At 1506, the network node can decrypt the encrypted data 1504 to determine a subscriber identifier (SID) and a terminal identifier (TID). At least one of the SID or the TID can be associated with a network terminal 102. For example, the TID can include an IMEI associated with the network terminal 102. Examples are discussed herein, e.g., with reference to FIGS. 5-9 #5. Further examples are discussed herein, e.g., with reference to block 1102.

At 1508, the network node can determine that the SID and TID are authorized for joint use. For example, the network node can determine that a given SUPI is authorized for the IMEI associated with the network terminal 102. Examples are discussed herein, e.g., with reference to FIGS. 5-9 #5. Further examples are discussed herein, e.g., with reference to blocks 1006, 1104, or 1108.

At 1510, the network node can transmit authorization information 1512 to the second network node. Authorization information 1512 can represent authorization information 502 or 1010. Block 1510 can be performed in response to the determination at block 1508 that the SID and the TID are bound (authorized for joint use), as discussed above. Examples are discussed herein, e.g., with reference to FIGS. 5-9 #6. Further examples are discussed herein, e.g., with reference to block 1008 and authorization information 502, 1010. In some examples, the authorization information 1512: does not include the SID; or does not include the TID. In some examples, the authorization information 1512 includes neither the SID nor the TID. Examples are discussed herein, e.g., with reference to FIG. 9 #6.

At 1514, subsequent to block 1510, the network node can receive a confirmation message 1516, e.g., an authorization confirmation, from the second network node. Examples are discussed herein, e.g., with reference to FIGS. 5 and 9 #8, or FIGS. 6-8 #9.

At 1518, the network node can determine that the confirmation message 1516 is associated with the network terminal 102. Examples are discussed herein, e.g., with reference to FIG. 9 and blocks 1608-1624, below.

At 1520, the network node can, in response to the determination at block 1518, transmit the SID and the TID (or at least one of those) to the second network node. For example, the network node can transmit the SID and the TID in a form readable by the serving network 132 or the RSN 902. Examples are discussed herein, e.g., with reference to FIGS. 5 and 9 #9, or FIGS. 6-8 #10. Block 1520 can include transmitting the SID and TID over a secure channel that conveys cleartext from the network node to the second network node while inhibiting eavesdropping, e.g., a Transport Layer Security (TLS)-secured channel or VPN tunnel between serving network 132, 902 and home network 134, or a link between serving network 132, 902 and home network 134 that is separated from other links for purposes of access control (e.g., a leased line).

Figure 16:
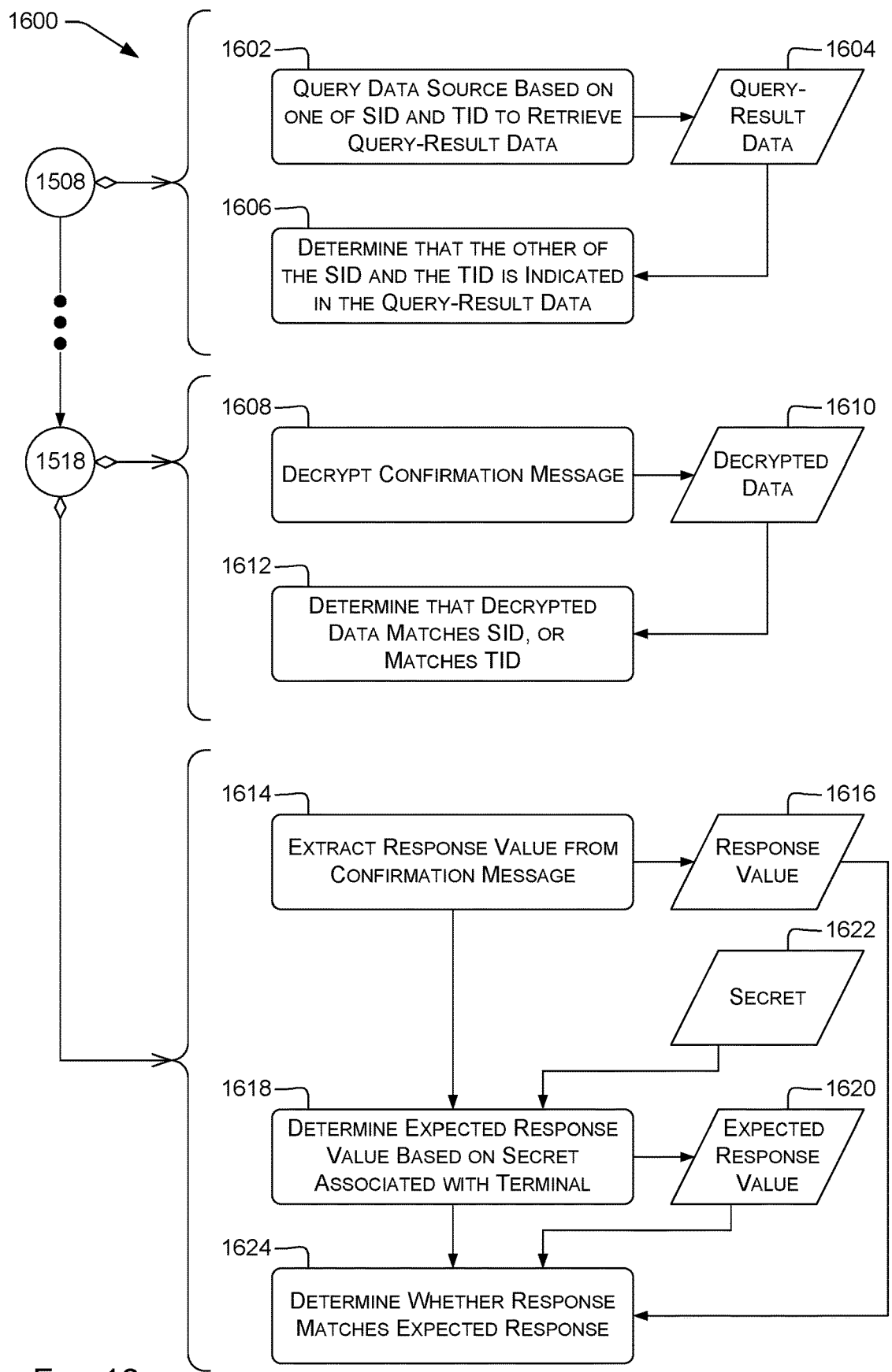
FIG. 16 is a dataflow diagram of an example process for verifying authorization for joint use of a subscriber identifier and a terminal identifier, and for validating communications with a terminal via a serving network, e.g., at a home network.

FIG. 16 illustrates an example process 1600 for controlling access to a network, and related data items. The illustrated process 1600 can be carried out by a control unit, e.g., of a network node of home network 134. In some examples, block 1508 of determining that the SID and the TID are authorized for joint use can include blocks 1602 and 1606. In some examples, block 1518 of determining that the confirmation message 1516 is associated with the network terminal includes blocks 1608 and 1612, or blocks 1614, 1618, and 1624.

At 1602, the network node can query a data source based at least in part on one of the SID and the TID to provide query-result data 1604. Examples are discussed herein, e.g., with reference to block 1104 and query-result data 1106.

At 1606, the network node can determine that the other of the SID and the TID (the one not indicated in the query) is indicated in the query-result data 1604. Examples are discussed herein, e.g., with reference to query-result data 1106 and block 1108.

At 1608, the network node can decrypt at least a portion of the confirmation message 1516 to provide decrypted data 1610. Examples are discussed herein, e.g., with reference to block 1102 or FIG. 9 #8.

At 1612, the network node can determine that either: the decrypted data 1610 matches the SID; or the decrypted data 1610 matches the TID. If either condition holds, the network node can determine that the confirmation message 1516 is associated with the network terminal 102.

At 1614, the network node can extract a response value 1616 (e.g., an LTE NAS RES value) from the confirmation message 1516.

At 1618, the network node can determine an expected response value 1620 (e.g., an LTE NAS XRES value) based at least in part on a secret 1622 (e.g., an LTE UE security key K) associated with the network terminal 102. In some examples, secret 1622 is known to the operator of home network 134 and is stored on a SIM/USIM (or other secure storage device) of terminal 102. In some examples, secret 1622 is not known to RSN 902.

At 1624, the network node can determine whether the response value 1616 matches the expected response value 1620. If so, the network node can determine that the confirmation message 1516 is associated with the network terminal.

Figure 17:
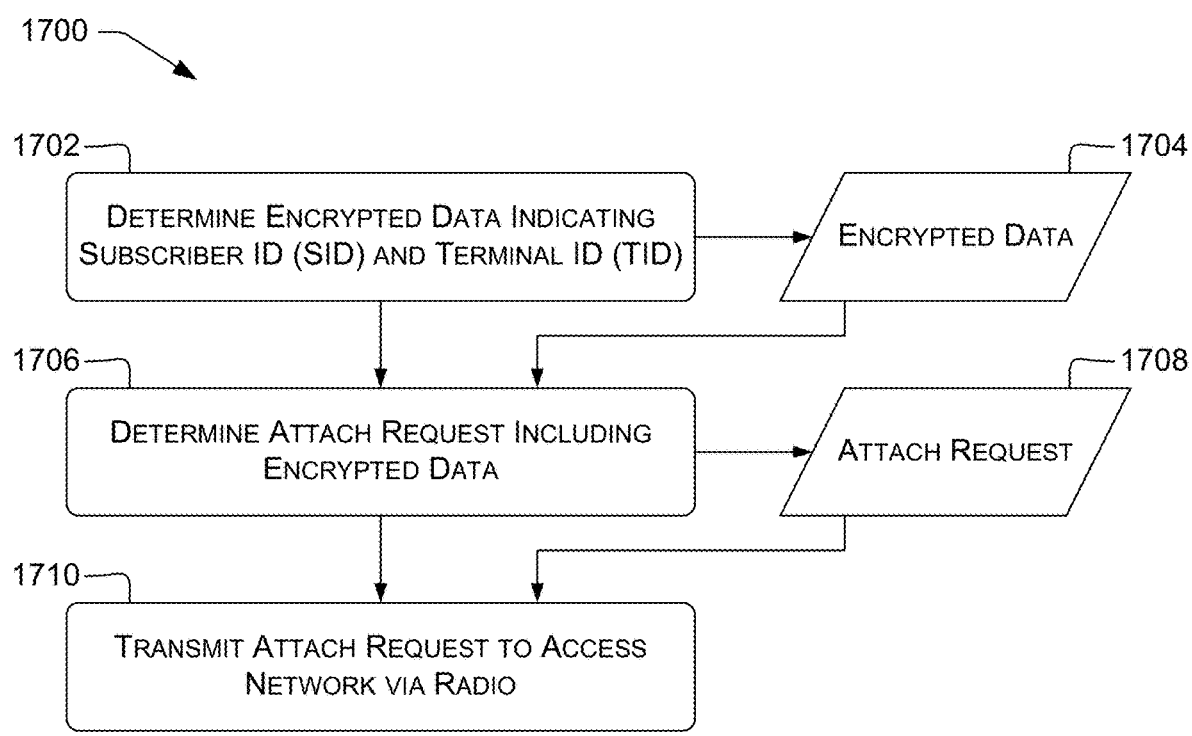
FIG. 17 is a dataflow diagram of an example process for attaching to a network, e.g., at a terminal.

FIG. 17 is a dataflow diagram illustrating an example process 1700 for attaching to a network, and related data items. Process 1700 can be performed, e.g., by a terminal 102. Terminal 102 can include a radio (e.g., communications interface 216) configured to communicate wirelessly with a network, e.g., an access network such as serving network 132 or home network 134. In some examples, terminal 102 includes a control unit. For example, terminal 102 can include one or more processors (e.g., processor 204) configured to perform operations described below, e.g., in response to computer program instructions stored in data storage system 210.

At 1702, terminal 102 can determine encrypted data 1704 indicating a subscriber identifier (SID) and a terminal identifier (TID). Examples are discussed herein, e.g., with reference to FIGS. 5-9 #2. In some examples, the encrypted data 1704 can include at least one of the SID or the TID, e.g., at least one of a SUPI or a Terminal_ID.

At 1706, terminal 102 can determine an attach request 1708 comprising the encrypted data 1704. Examples are discussed herein, e.g., with reference to FIGS. 5-9 #3. For example, the attach request can be an LTE or 5G attach request.

At 1710, terminal 102 can transmit the attach request 1708 to an access network via the radio. Examples are discussed herein, e.g., with reference to FIGS. 5-9 #3.

FIG. 18 illustrates an example process 1800 for attaching to a network, and related data items. The illustrated process 1800 can be carried out by a control unit, e.g., of a terminal 102. In some examples, block 1702 can include blocks 1802 and 1804, or blocks 1810, 1812, and 1816. In some examples, block 1706 can include block 1808, block 1820, or block 1822.

At 1802, the terminal can determine the encrypted data 1704 further indicating a transaction-specific value (TSV), e.g., an R value. Examples are discussed herein, e.g., with reference to FIGS. 6-8 #2.

At 1804, the terminal can determine a cryptographic hash 1806 of at least: the TSV; and at least one of the SID or the TID. Examples are discussed herein, e.g., with reference to FIGS. 6-8 #3 or blocks 1314, 1416, or 1422.

At 1808, the terminal can determine the attach request further comprising the cryptographic hash 1806. Examples are discussed herein, e.g., with reference to FIGS. 6-8 #3.

At 1810, the terminal can determine the encrypted data 1704 further indicating a first TSV and a second TSV. Examples are discussed herein, e.g., with reference to FIGS. 6-8 #2, or FIG. 7 #3.

At 1812, the terminal can determine a first cryptographic hash 1814 of at least: the first TSV; and one of the SID or the TID. Examples are discussed herein, e.g., with reference to FIGS. 6-8 #2 or FIG. 7 #3.

At 1816, the terminal can determine a second cryptographic hash 1818 of at least: the second TSV; and the other of the SID or the TID. Examples are discussed herein, e.g., with reference to FIGS. 6-8 #2 or FIG. 7 #3.

At 1820, the terminal can determine the attach request 1708 further comprising the first cryptographic hash 1814 and the second cryptographic hash 1818. Examples are discussed herein, e.g., with reference to FIGS. 6-8 #3.

At 1822, the terminal can determine the attach request 1708 excluding at least one of (e.g., excluding both of) the SID or the TID. Examples are discussed herein, e.g., with reference to FIGS. 6-8 #3. Excluding the SID or the TID from attach request 1708 can improve user privacy by reducing the amount of information provided to a serving network 132.

EXAMPLE CLAUSES

Various examples include one or more of, including any combination of any number of, the following example features. Throughout these clauses, parenthetical remarks are for example and explanation, and are not limiting. Parenthetical remarks given in this Example Clauses section with respect to specific language apply to corresponding language throughout this section, unless otherwise indicated.

A: A method comprising, by a first network node: receiving, from a second network node associated with an access network, first data indicating a subscriber identifier (SID) and a terminal identifier (TID); determining that the SID and TID are authorized for joint use; and in response, transmitting authorization information to the second network node.

B: The method according to paragraph A, wherein: the SID comprises a Subscriber Permanent Identifier (SUPI); the TID comprises a Permanent Equipment Identifier (PEI); and the authorization information comprises a Long Term Evolution (LTE) or fifth-generation authentication vector.

C: The method according to paragraph A or B, wherein the determining comprises, by the first network node: querying a data source based at least in part on one of the SID and the TID to retrieve query-result data; and determining that the other of the SID and the TID is indicated in the query-result data.

D: The method according to any of paragraphs A-C, wherein: the first data comprises encrypted data; and the method further comprises decrypting, by the first network node, the encrypted data to determine the SID and the TID.

E: A first network node associated with an access network, the first network node comprising: a communications interface; and a control unit configured to perform operations comprising: receiving, from a network terminal, an attach request comprising identification data and verification data; transmitting, to a second network node, the identification data; receiving, from the second network node, identity data associated with the network terminal, wherein the identity data comprises at least one of a subscriber identifier (SID) and a terminal identifier (TID); determining that the identity data corresponds with the verification data; and in response, transmitting an authentication request to the network terminal.

F: The first network node according to paragraph E, wherein: the identification data comprises encrypted data; and the identity data comprises at least one of: the SID including a Subscriber Permanent Identifier (SUPI); or the TID including a Permanent Equipment Identifier (PEI).

G: The first network node according to paragraph E or F, wherein: the verification data comprises a first cryptographic hash; and the operations for determining comprise: computing a second cryptographic hash of at least the identity data; and determining that the second cryptographic hash matches the first cryptographic hash.

H: The first network node according to paragraph G, the operations further comprising: receiving, from the second network node, a transaction-specific value (TSV) associated with the identification data; and computing the second cryptographic hash further of at least the TSV.

I: The first network node according to paragraph H, the operations further comprising: receiving, from the network terminal, second verification data; receiving, from the second network node, second identity data associated with the network terminal; and determining that the second identity data corresponds with the second verification data.

J: The first network node according to paragraph I, wherein: the second verification data comprises a third cryptographic hash; and the operations for determining that the second identity data corresponds with the second verification data comprise: computing a fourth cryptographic hash of at least the second identity data; and determining that the fourth cryptographic hash matches the third cryptographic hash.

K: The first network node according to paragraph J, the operations further comprising computing the fourth cryptographic hash further of at least the TSV.

L: The first network node according to paragraph J or K, the operations further comprising: receiving, from the second network node, a second, different TSV associated with the second identity data; and computing the fourth cryptographic hash further of at least the second TSV.

M: The first network node according to any of paragraphs H-L, the operations further comprising: receiving, from the second network node, second identity data associated with the network terminal; and computing the second cryptographic hash further of at least the second identity data.

N: At least one computer-readable medium comprising instructions that, when executed by at least one processor, cause the at least one processor to perform operations comprising: receiving, from a network node associated with an access network, encrypted data; decrypting the encrypted data to determine a subscriber identifier (SID) and a terminal identifier (TID), wherein at least one of the SID or the TID is associated with a network terminal; determining that the SID and TID are authorized for joint use; in response, transmitting authorization information to the network node; subsequently, receiving a confirmation message from the network node; determining that the confirmation message is associated with the network terminal; and in response, transmitting the SID and the TID to the network node.

O: The method according to paragraph N, wherein the authorization information: does not include the SID; or does not include the TID.

P: The method according to paragraph O, the operations further comprising determining that the confirmation message is associated with the network terminal by: decrypting at least a portion of the confirmation message to provide decrypted data; and determining that either: the decrypted data matches the SID; or the decrypted data matches the TID.

Q: The method according to any of paragraphs N-P, the operations further comprising: extracting a response value from the confirmation message; determining an expected response value based at least in part on a secret associated with the network terminal; and determining that the confirmation message is associated with the network terminal in response to a match between the response value and the expected response value.

R: The method according to any of paragraphs N-Q, the operations further comprising determining that the SID and the TID are authorized for joint use by: querying a data source based at least in part on one of the SID and the TID to provide query-result data; and determining that the other of the SID and the TID is indicated in the query-result data.

S: A network terminal, comprising: a radio configured to communicate wirelessly with a network; and a control unit communicatively connected with the radio and configured to perform operations comprising: determining encrypted data indicating a subscriber identifier (SID) and a terminal identifier (TID); determining an attach request comprising the encrypted data; and transmitting the attach request to an access network via the radio.

T: The network terminal according to paragraph S, wherein the operations comprise determining the attach request excluding at least one of the SID or the TID.

U: The network terminal according to paragraph S or T, wherein the operations comprise: determining the encrypted data further indicating a transaction-specific value (TSV); determining a cryptographic hash of at least: the TSV; and at least one of the SID or the TID; and determining the attach request further comprising the cryptographic hash.

V: The network terminal according to any of paragraphs S-U, wherein the operations comprise: determining the encrypted data further indicating a first TSV and a second TSV; determining a first cryptographic hash of at least: the first TSV; and one of the SID or the TID; determining a second cryptographic hash of at least: the second TSV; and the other of the SID or the TID; and determining the attach request further comprising the first cryptographic hash and the second cryptographic hash.

W: A computer-readable medium, e.g., a computer storage medium, having thereon computer-executable instructions, the computer-executable instructions upon execution configuring a computer to perform operations as any of paragraphs A-D, E-M, N-R, or S-U recites.

X: A device comprising: a processor; and a computer-readable medium, e.g., a computer storage medium, having thereon computer-executable instructions, the computer-executable instructions upon execution by the processor configuring the device to perform operations as any of paragraphs A-D, E-M, N-R, or S-U recites.

Y: A system comprising: means for processing; and means for storing having thereon computer-executable instructions, the computer-executable instructions including means to configure the system to carry out a method as any of paragraphs A-D, E-M, N-R, or S-U recites.

CONCLUSION

In view of the foregoing, various aspects include attach procedures that provide improved subscriber privacy, security, reduced risk of unauthorized or fraudulent use of terminals (e.g., stolen terminals), or reduced risk or severity of DoS attacks. In some examples, lawful-intercept functions are unaffected by the examples of attach procedures in FIG. 5-9 or 10-18. Those attach procedures can change the information available to serving network 132 without changing post-attach processing, including signaling, media transport, or lawful intercept.

This disclosure is inclusive of combinations of the aspects described herein. References to "a particular aspect" (or "embodiment" or "version") and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting.

Although some features and examples herein have been described in language specific to structural features or methodological steps, it is to be understood that the subject matter herein is not necessarily limited to the specific features or steps described. Rather, the specific features and steps are disclosed as preferred forms of implementing the claimed invention. For example, network nodes shown in FIG. 1, processor 204 and other components of system 202, network 212, and other structures described herein for which multiple types of implementing devices or structures are listed can include any of the listed types, and/or multiples and/or combinations thereof.

Similarly, the operations of example processes herein are illustrated in individual blocks and logical flows thereof, and are summarized with reference to those blocks. The order in which the operations are described is not intended to be construed as a limitation unless otherwise indicated, and any number of the described operations can be executed in any order, combined in any order, subdivided into multiple sub-operations, or executed in parallel to implement the described processes. For example, in alternative implementations included within the scope of the examples described herein, elements or functions can be deleted, or executed out of order from that shown or discussed, including substantially synchronously or in reverse order.

Each illustrated block can represent one or more operations that can be implemented in hardware, software, or a combination thereof. In the context of software, the operations described herein represent computer-executable instructions stored on at least one computer-readable medium that, when executed by one or more processors, enable the one or more processors to perform the recited operations. Accordingly, the methods and processes described above can be embodied in, and fully automated via, software code modules executed by one or more computers or processors. Generally, computer-executable instructions include routines, programs, objects, modules, code segments, components, data structures, and the like that perform particular functions or implement particular abstract data types. Some or all of the methods can additionally or alternatively be embodied in specialized computer hardware. For example, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system." The described processes can be performed by resources associated with one or more data-processing systems 202, 220 or processors 204, such as one or more internal or external CPUs or GPUs, or one or more pieces of hardware logic such as FPGAs, DSPs, or other types of accelerators.

Conditional language such as, among others, "can," "could," "might" or "may," unless specifically stated otherwise, are understood within the context to present that certain examples include, while other examples do not include, certain features, elements or steps. Thus, such conditional language is not generally intended to imply that certain features, elements or steps are in any way required for one or more examples or that one or more examples necessarily include logic for deciding, with or without user input or prompting, whether certain features, elements or steps are included or are to be performed in any particular example.

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," and/or any of those phrases with "and/or" substituted for "or," unless specifically stated otherwise, is to be understood as signifying that an item, term, etc., can be either X, Y, or Z, or a combination of any elements thereof (e.g., a combination of XY, XZ, YZ, and/or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated. As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present.

It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s). Additionally, in any claim using the "comprising" transitional phrase, recitation of a specific number of components (e.g., "two Xs") is not limited to embodiments including exactly that number of those components, unless expressly specified (e.g., "exactly two Xs"). However, such a claim does describe both embodiments that include exactly the specified number of those components and embodiments that include at least the specified number of those components.

The invention claimed is:

1. At least one non-transitory computer-readable medium comprising instructions that, when executed by at least one processor, cause the at least one processor to perform operations comprising:
   receiving, from a network node associated with an access network, encrypted data;
   decrypting the encrypted data to determine a subscriber identifier (SID) and a terminal identifier (TID), wherein at least one of the SID or the TID is associated with a network terminal;
   determining that the SID and TID are authorized for joint use;
   in response, transmitting authorization information to the network node;
   subsequently, receiving a confirmation message from the network node;
   determining that the confirmation message is associated with the network terminal; and
   in response, transmitting the SID and the TID to the network node.

2. The at least one computer-readable medium according to claim 1, wherein the authorization information:
   does not include the SID; or
   does not include the TID.

3. The at least one computer-readable medium according to claim 2, the operations further comprising determining that the confirmation message is associated with the network terminal by:
   decrypting at least a portion of the confirmation message to provide decrypted data; and
   determining that either:
      the decrypted data matches the SID; or
      the decrypted data matches the TID.

4. The at least one computer-readable medium according to claim 1, the operations further comprising:
   extracting a response value from the confirmation message;
   determining an expected response value based at least in part on a secret associated with the network terminal; and
   determining that the confirmation message is associated with the network terminal in response to a match between the response value and the expected response value.

5. The at least one computer-readable medium according to claim 1, the operations further comprising determining that the SID and the TID are authorized for joint use by:

querying a data source based at least in part on one of the SID and the TID to provide query-result data; and determining that the other of the SID and the TID is indicated in the query-result data.

6. The at least one computer-readable medium according to claim 1, wherein:

the SID comprises a Subscriber Permanent Identifier (SUPI);

the TID comprises a Permanent Equipment Identifier (PEI); and the authorization information comprises a Long Term Evolution (LTE) or fifth-generation (5G) authentication vector.

7. The at least one computer-readable medium according to claim 1, wherein a processor of the at least one processor is a processor of a network node associated with a home network.

8. A system comprising:

a first network node comprising:

a communications interface; and a control unit configured to perform operations comprising:

receiving, from a second network node associated with an access network, encrypted data;

decrypting the encrypted data to determine a subscriber identifier (SID) and a terminal identifier (TID), wherein at least one of the SID or the TID is associated with a network terminal;

determining that the SID and TID are authorized for joint use;

in response, transmitting authorization information to the second network node;

subsequently, receiving a confirmation message from the second network node;

determining that the confirmation message is associated with the network terminal; and in response, transmitting the SID and the TID to the second network node.

9. The system according to claim 8, wherein the authorization information:

does not include the SID; or does not include the TID.

10. The system according to claim 9, the operations further comprising determining that the confirmation message is associated with the network terminal by:

decrypting at least a portion of the confirmation message to provide decrypted data; and determining that either:

the decrypted data matches the SID; or the decrypted data matches the TID.

11. The system according to claim 8, the operations further comprising:

extracting a response value from the confirmation message;

determining an expected response value based at least in part on a secret associated with the network terminal; and determining that the confirmation message is associated with the network terminal in response to a match between the response value and the expected response value.

12. The system according to claim 8, the operations further comprising determining that the SID and the TID are authorized for joint use by:

querying a data source based at least in part on one of the SID and the TID to provide query-result data; and determining that the other of the SID and the TID is indicated in the query-result data.

13. The system according to claim 8, wherein:

the SID comprises a Subscriber Permanent Identifier (SUPI);

the TID comprises a Permanent Equipment Identifier (PEI); and the authorization information comprises a Long Term Evolution (LTE) or fifth-generation (5G) authentication vector.

14. The system according to claim 8, wherein the first network node is associated with a home network.

15. A method comprising:

receiving, from a network node associated with an access network, encrypted data;

decrypting the encrypted data to determine a subscriber identifier (SID) and a terminal identifier (TID), wherein at least one of the SID or the TID is associated with a network terminal;

determining that the SID and TID are authorized for joint use;

in response, transmitting authorization information to the network node;

subsequently, receiving a confirmation message from the network node;

determining that the confirmation message is associated with the network terminal; and in response, transmitting the SID and the TID to the network node.

16. The method according to claim 15, wherein the authorization information:

does not include the SID; or does not include the TID.

17. The at method according to claim 16, further comprising determining that the confirmation message is associated with the network terminal by:

decrypting at least a portion of the confirmation message to provide decrypted data; and determining that either:

the decrypted data matches the SID; or the decrypted data matches the TID.

18. The method according to claim 15, further comprising:

extracting a response value from the confirmation message;

determining an expected response value based at least in part on a secret associated with the network terminal; and determining that the confirmation message is associated with the network terminal in response to a match between the response value and the expected response value.

19. The method according to claim 15, comprising determining that the SID and the TID are authorized for joint use by:

querying a data source based at least in part on one of the SID and the TID to provide query-result data; and determining that the other of the SID and the TID is indicated in the query-result data.

20. The method according to claim 15, wherein:

the SID comprises a Subscriber Permanent Identifier (SUPI);

the TID comprises a Permanent Equipment Identifier (PEI); and the authorization information comprises a Long Term Evolution (LTE) or fifth-generation (5G) authentication vector.

\* \* \* \* \*